US012720411B2

(12) United States Patent
Telang et al.

(10) Patent No.: US 12,720,411 B2
(45) Date of Patent: Aug. 25, 2026

(54) ADAPTIVE PUBLIC LAND MOBILE NETWORK MANAGEMENT FOR VARYING NETWORK CONDITIONS

(71) Applicant: GOOGLE LLC, Mountain View, CA (US)

(72) Inventors: Mahesh Devdatta Telang, Mountain View, CA (US); Qin Zhang, Mountain View, CA (US); Shivank Nayak, Milpitas, CA (US); Rukun Mao, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 189 days.

(21) Appl. No.: 18/535,743

(22) Filed: Dec. 11, 2023

(65) Prior Publication Data

US 2024/0137842 A1 Apr. 25, 2024

Related U.S. Application Data

(63) Continuation of application No. 17/405,798, filed on Aug. 18, 2021, now Pat. No. 11,871,331, which is a (Continued)

(51) Int. Cl.

*H04W 48/02* (2009.01)
*H04W 8/24* (2009.01)

(Continued)

(52) U.S. Cl.

CPC ............. *H04W 48/02* (2013.01); *H04W 8/24* (2013.01); *H04W 60/00* (2013.01); *H04W 84/042* (2013.01)

(58) Field of Classification Search

CPC ....... H04W 60/00; H04W 60/04; H04W 8/24; H04W 48/02; H04W 84/042; H04W 48/16

See application file for complete search history.

(56) References Cited

U.S. PATENT DOCUMENTS

| | | | |
|---|---|---|---|
| 2001/0050943 A1 | 12/2001 | Mahany | |
| 2011/0021154 A1 | 1/2011 | Marinier et al. | |

(Continued)

FOREIGN PATENT DOCUMENTS

| | | |
|---|---|---|
| CN | 101646214 A | 2/2010 |
| CN | 103237336 A | 8/2013 |

(Continued)

OTHER PUBLICATIONS

Translation of Chinese Notice of Allowance mailed Feb. 29, 2024 for CN Application No. 202080064122.0, 6 pages.

(Continued)

*Primary Examiner* — Congvan Tran

(57) ABSTRACT

The present disclosure describes apparatuses and techniques of adaptive PLMN management for varying network conditions. In some aspects, a PLMN manager of a user equipment (UE) searches, as part of a registration procedure, a data repository of PLMN information that includes a PLMN blocked from registration for a duration of time and determines that the PLMN is blocked due to a signal-related condition with a cell of the PLMN (e.g., weak signal). The PLMN manager then determines, during the duration of time, that the signal-related condition between the UE and the cell has improved. In response to the improvement, the PLMN manager unblocks the PLMN before expiration of the duration of time. By so doing, the UE may reattempt registration with the unblocked PLMN at least once before the duration of time expires, which may allow the UE to register more quickly and reestablish network services.

20 Claims, 15 Drawing Sheets

Related U.S. Application Data continuation of application No. 16/712,697, filed on Dec. 12, 2019, now Pat. No. 11,109,299.

(51) Int. Cl.
*H04W 60/00* (2009.01)
*H04W 84/04* (2009.01)

(56) References Cited

U.S. PATENT DOCUMENTS

| | | | | |
|---|---|---|---|---|
| 2012/0077456 | A1* | 3/2012 | Tiwari | H04W 48/16 455/404.1 |
| 2017/0202000 | A1 | 7/2017 | Fu et al. | |
| 2018/0049083 | A1 | 2/2018 | Kubota et al. | |
| 2018/0098255 | A1 | 4/2018 | Murugan | |
| 2022/0217522 | A1* | 7/2022 | Kim | H04W 8/02 |
| 2022/0279430 | A1* | 9/2022 | Tamura | H04W 12/06 |

FOREIGN PATENT DOCUMENTS

| | | | |
|---|---|---|---|
| CN | 105393603 | A | 3/2016 |
| CN | 107948994 | A | 4/2018 |
| CN | 109257776 | A | 1/2019 |
| CN | 110301130 | A | 10/2019 |
| JP | 2015061289 | A | 3/2015 |
| WO | 2016163635 | A1 | 10/2016 |
| WO | 2018182972 | A1 | 10/2018 |
| WO | 2020239011 | A1 | 12/2020 |

OTHER PUBLICATIONS

Translation of Korean Office Action mailed Mar. 29, 2024 for KR Application No. 1020227008177, 9 pages.
International Preliminary Report on Patentability mailed May 17, 2022 for International Application No. PCT/US2020/040900, 36 pages.
Translation of Chinese Notice of Allowance mailed Jun. 13, 2025 for CN Application No. 202410515156.7, 6 pages.
Translation of Korean Notice of Allowance mailed Nov. 8, 2024 for KR Application No. 10-2022-7008177, 5 pages.
Translation of Indian Oral Hearing Notice mailed Dec. 26, 2024 for IN Application No. 202247011027, 2 pages.
Translation of Notification of First Office Action mailed Jan. 15, 2025 for CN Application No. 202410515156.7, 11 pages.
Translation of Notification of Grant of Patent for IN Application No. 202247011027, 2 pages.
Translation of Japanese Office Action mailed Jan. 16, 2024 for JP Application No. 2023-002580, 7 pages.
Translation of Chinese Office Action mailed Sep. 18, 2023 for CN Application No. 202080064122.0, 29 pages.
Communication under Rule 71(3) EPC mailed Aug. 26, 2025 for EP Application No. 20746805.9, 83 pages.
Extended European Search Report dated May 20, 2026 for EP Application No. 26157658.1, 28 pages.

* cited by examiner

102
PLMN Manager
144
UE Capability Manager
146
116
118
136
108
110
120
138
112
114
122
128
130
132
134
MME
140
EPC
124
AMF
142
5GC
126
PLMN
104
PLMN
106

200

214

RF Front End 216

Transceiver(s) 218

Sensors 220

Processor(s) 222

Computer-Readable Storage Media 224

UE Data 226

Applications 228

User Interface(s) 230

PLMN Manager 144

PLMN Information 232

Capability Manager 146

UE Capability Info. 234

API 236

Display 238

UE 102

202

204

206

208

210

212

Detect ATTACH or TAU failure with a PLMN
1102

Maximum registration failure?
1104

False

No further action
1106

True

Block PLMN by adding the PLMN to a temporary PLMN forbidden list
1108

Poor network conditions?
1110

False

No further action
1112

True

Flag the PLMN as blocked due to poor network conditions
1114

From FIG. 11A

New registration procedure 1118

Perform PLMN search through acquisition database 1120

PLMN blocked for poor network conditions? 1122

No further action 1124

False

True

Cell meet network conditions? 1126

No further action 1128

False

True

Unblock the PLMN for registration before time-based removal of the PLMN from PLMN forbidden list 1130

Registration with the PLMN successful 1132

Return the PLMN to the PLMN forbidden list for time-based removal 1134

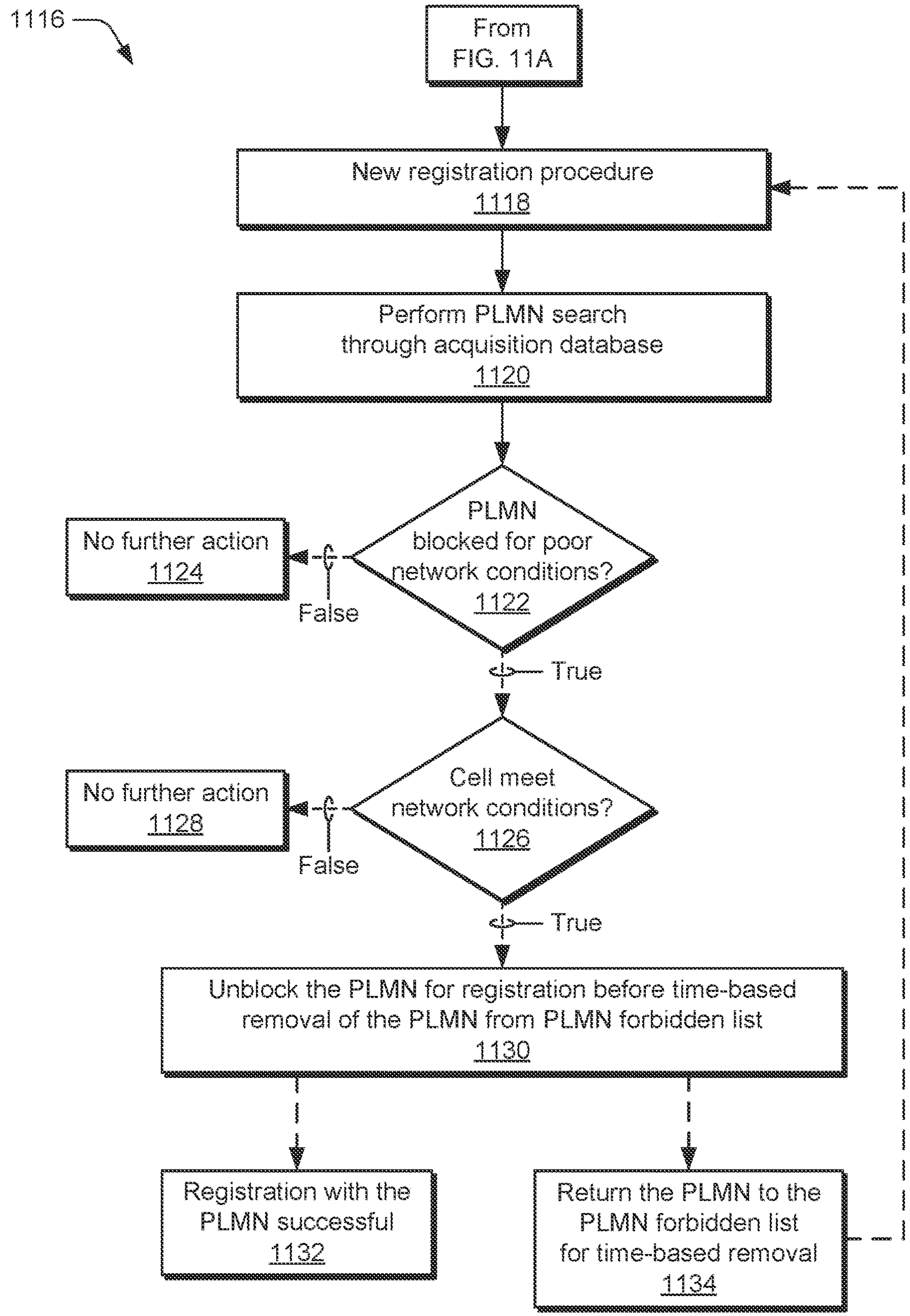

FIG. 11B

ADAPTIVE PUBLIC LAND MOBILE NETWORK MANAGEMENT FOR VARYING NETWORK CONDITIONS

CROSS-REFERENCE TO RELATED APPLICATIONS

The present application is a continuation application of U.S. patent application Ser. No. 17/405,798, entitled "Adaptive User Equipment Capability Management for Varying Network Conditions" and filed on Aug. 18, 2021, and U.S. patent application Ser. No. 16/712,697, entitled "Adaptive Public Land Mobile Network Management for Varying Network Conditions," filed on Dec. 12, 2019, and granted as U.S. Pat. No. 11,109,299, the entireties of which are incorporated by reference herein.

BACKGROUND

The proliferation of wireless communication technology has greatly increased the number of devices that are able to access remote data or other services through wireless networks. For wide-area networks, such as cellular networks, a core network operator typically provides telecommunication services to mobile stations throughout a network. One example of a network is a Public Land Mobile Network (PLMN) that includes a core network and base stations. The base stations collectively form a Radio Access Network (RAN) connected to the network. To communicate wirelessly with the network, a mobile station may establish a connection to the core network via a cell (e.g., a base station, a serving cell) of the PLMN.

During an ATTACH procedure to establish this connection, the network will inquire regarding wireless communication capabilities supported by the mobile station. For successful attachment with the PLMN, the mobile station needs to respond to the network with its capabilities that include supported frequency bands and other parameters of wireless communication. For increased data rates, some mobile stations and networks implement carrier aggregation (CA), which allows a mobile station to use multiple channels to communicate data with the network. To enable carrier aggregation, the mobile station also communicates various combinations of CA parameters, such as carriers, bands, and bandwidths, to the network as part of its capabilities for wireless communication.

As networks deploy more CA-capable cells with multiple bands, however, the number and size of CA parameter combinations supported by many mobile stations have grown substantially. With this increase in the number and size of CA parameter combinations, the mobile station's capabilities message transmitted to the network during the ATTACH procedure has also considerably increased in size. In cases of poor network coverage or weak signal strength, the transmission of a capabilities message that includes the CA parameter combinations often takes longer to complete because of reduced network throughput. Due to guard times implemented by many network operators, a connection with the mobile station may be dropped during the ATTACH procedure when a complete capabilities message is not received from the mobile station inside of the guard time. Additionally, after multiple failed ATTACH procedures, the mobile station will block the PLMN from subsequent ATTACH procedures for a length of time. As such, mobile stations with poor network coverage are often unable to complete an ATTACH procedure with a PLMN or may be blocked from reattempting an ATTACH procedure for a length of time, during which network service of the mobile station may be impaired or denied.

SUMMARY

This disclosure describes apparatuses and techniques of adaptive PLMN management for varying network conditions. In some aspects, a user equipment performs a method that includes searching, as part of a registration procedure, a data repository of PLMN information that includes a PLMN blocked from registration for a predefined duration of time. The method then determines that the PLMN blocked from registration is blocked due to a signal-related condition of a connection between the UE and a cell of the PLMN. The method also includes determining, during the predefined duration of time, that the signal-related condition of the connection between the UE and the cell of the PLMN has improved. In response to the improvement of the signal-related condition, the method unblocks the PLMN from registration. The method then transmits, to the cell of the PLMN, a request for registration with the PLMN that is unblocked to enable registration with the PLMN before expiration of the predefined duration of time.

In other aspects, a user equipment performs a method that includes transmitting to a cell of a PLMN, a first request for registration with the PLMN. The method then detects a failure of the first request for registration with the PLMN during a stage of sending a UE capability message. The method includes determining that a signal-related characteristic for communicating with the cell of the PLMN fails to meet a threshold and identifying the PLMN registration failure as based on the signal-related characteristic. The method then determines, during the duration of time, whether the signal-related characteristic for communicating with the cell of the PLMN has remained the same, improved, or deteriorated. In response to the determination of the signal-related characteristic, the method uses fewer or more CA combination in UE capability message during the next request for registration with the PLMN. If signal conditions improve significantly, the UE may make another attempt for registration before expiration of the duration of time.

In yet other aspects, a user equipment includes a transceiver operably coupled with one or more antennas, a hardware-based processor associated with the transceiver, and computer-readable storage media storing instructions that are executable by the hardware-based processor of the UE. The instructions can be executed to implement a PLMN manager, which is configured to direct the user equipment to search, as part of a registration procedure, a data repository of PLMN information that includes a PLMN blocked from registration for a predefined duration of time. The PLMN manager determines that the PLMN blocked from registration is blocked due to a signal-related condition of a connection between the UE and a cell of the PLMN. The PLMN manager then determines, via the transceiver and during the duration of time, that the signal-related condition of the connection between the UE and the cell of the PLMN has improved. In response to the improvement of the signal-related condition, the PLMN manager unblocks the PLMN from registration. The PLMN manager then transmits, via the transceiver and to the base station of the PLMN, a request for registration with the PLMN that is unblocked to enable registration with the PLMN before expiration of the predefined duration of time.

The details of one or more implementations of adaptive PLMN management are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

This specification describes apparatuses and techniques of adaptive public land mobile network (PLMN) management for varying network conditions with reference to the following drawings. The same numbers are used throughout the drawings to reference like features and components:

FIGS. 11A and 11B illustrate an example method for adaptive PLMN unblocking in varying network conditions.

DETAILED DESCRIPTION

Overview

Figure 1:
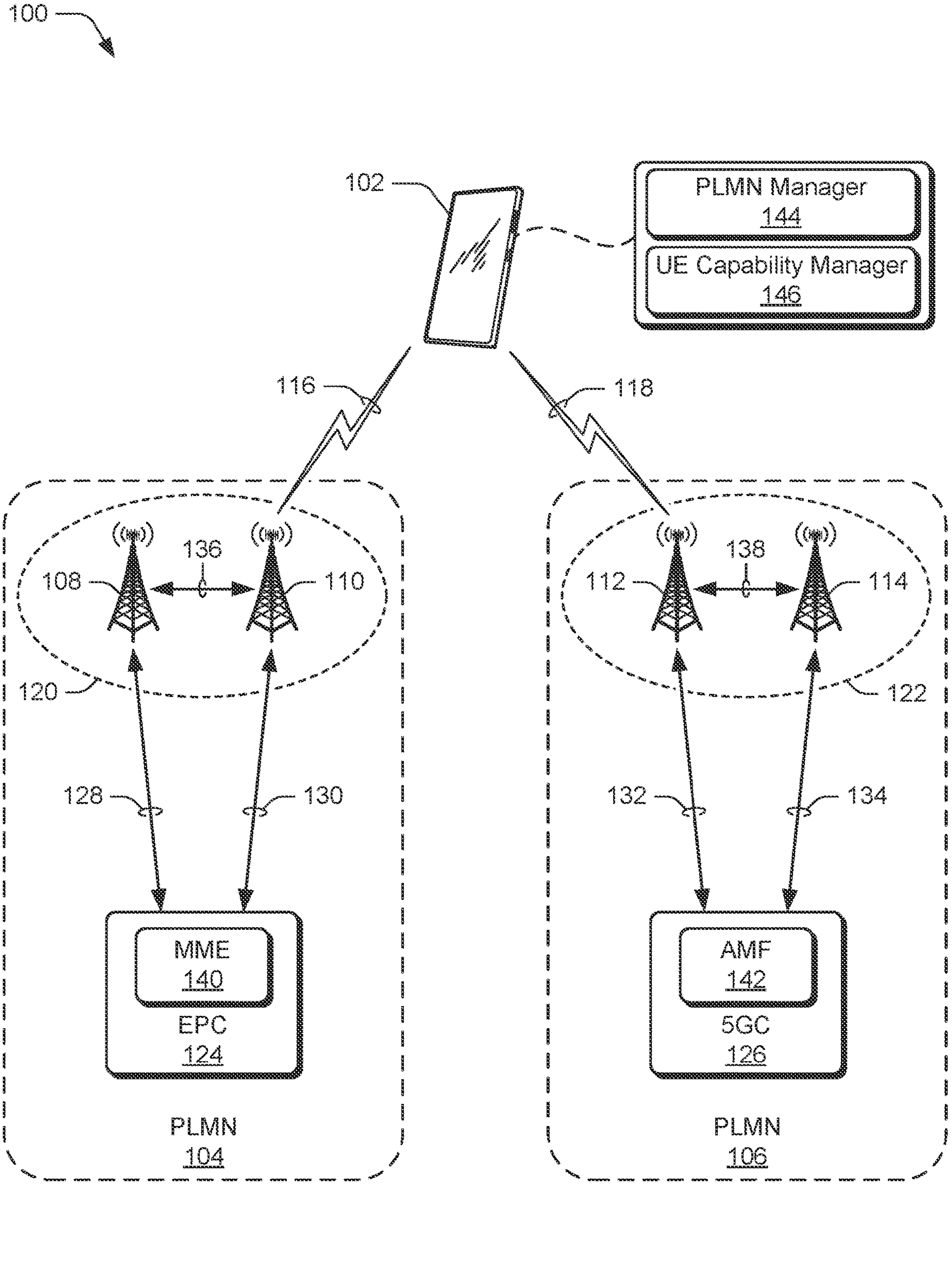
FIG. 1 illustrates an example wireless network environment in which various aspects of adaptive PLMN management for varying network conditions can be implemented.

User equipment accesses a cellular network, such as a Public Land Mobile Network (PLMN) through a communication link or "connection" with a base station or serving cell of the network. As part of establishing or maintaining the connection, the user equipment (UE) may register with the PLMN, such as through an ATTACH procedure or Tracking Area Update (TAU). When a UE attempts registration with the PLMN (network), the network will inquire regarding wireless communication capabilities of the UE. For successful registration, the UE may respond to the network with its wireless communication capabilities (e.g., UE capability message) to enable communication between the UE and the network. Some UEs and PLMNs offer increased bandwidth through carrier aggregation (CA), which enables a UE to use multiple channels to communicate data with the network. To enable carrier aggregation with a network, these UEs also communicate various combinations of CA parameters, such as carriers, bands, and bandwidths, to the network as part of their UE capabilities message.

As networks deploy more CA-capable cells with multiple bands, however, the number and size of CA parameter combinations supported by many of the UEs have grown substantially. With this increase in quantity and size of CA parameter combinations, the UE's capability message transmitted during registration with the PLMN has also increased in size considerably. In cases of poor network coverage or weak signal strength, transmission of a UE capability message that includes the CA parameter combinations often takes longer to complete due to reduced network throughput. Due to guard times implemented by many network operators, a connection (e.g., radio resource control (RRC) connection) with the UE may be released by the network during registration if a complete UE capability message is not received inside of the guard time. After registration fails or the connection is released, the UE is forced to reattempt registration through another ATTACH procedure. Per conventional techniques of PLMN selection, a UE may only make five registration attempts before the PLMN is blocked by being added to a temporary forbidden PLMN list for duration of time (e.g., 12 minutes per a T3402 timer). As such, the UE may block a preferred PLMN due to previously poor network conditions, which may cause a denial of service or impair service for a substantial duration of time. In some cases, the PLMN remains blocked through the duration of time (e.g., 12 minutes) despite the UE moving back to good network coverage or network conditions improving, which may further frustrate a user of the UE.

This disclosure describes apparatuses and techniques of adaptive PLMN management for varying network conditions. As described, aspects of adaptive PLMN management may adaptively unblock a PLMN when signaling conditions of a UE improve, such as when the UE moves to an area with better network coverage. Generally, as a result of adaptive PLMN unblocking, the UE may register with a PLMN more quickly than permitted by conventional techniques that lack any provision for unblocking. In some cases, the UE may register with the PLMN after moving out of a poor signaling area (e.g., poor network conditions) without waiting for an entire duration of time as specified by various communication specifications for PLMNs on a forbidden list (e.g., 12 minutes).

By way of example, in some scenarios, a UE receives coverage from only one cell of a PLMN and that cell may support only Long-Term Evolution (LTE) service without support for legacy access technologies. When poor network conditions (e.g., poor signaling) cause the UE to block the PLMN, the UE would typically block the PLMN and prevent the UE from receiving any voice or circuit-switched services (e.g., legacy services) on the LTE service for substantial length of time (e.g., 12 minutes). By implementing aspects of adaptive PLMN management, the UE may attempt registration more quickly (e.g., less than the full 12 minutes) once network conditions of the UE improve, such as when the UE moves to an area with moderate or good network coverage. Generally, for a global UE with legacy support, the UE may be able to attempt registration based on expiration of a periodic better system reselection (BSR) timer (e.g., 90-120 seconds). As such, aspects of adaptive PLMN management may enable registration with a PLMN more quickly, such as when signaling conditions improve.

This disclosure also describes apparatuses and techniques of adaptive UE capability management for marginal network conditions. In some aspects, a UE capability manager may modify UE capability information to increase a probability of successful registration in marginal network conditions (e.g., weak signal areas) and without affecting UE capabilities in good signal conditions. As noted, in some scenarios a UE may receive coverage from only one cell of a PLMN and that cell may support only Long-Term Evolution (LTE) service without support for legacy access technologies. In these scenarios, the UE may be prevented from receiving any voice or circuit-switched services on the LTE service for a substantial length of time in response to multiple failed registration attempts. By implementing aspects of adaptive UE capability management, the UE may instead be able to register with a reduced or minimal set of UE capabilities, which enable the UE to receive voice and data services through the LTE service. Additionally, by acquiring the LTE service (or other third generation (3G) service), the UE is precluded from scanning for legacy services (e.g., second generation (2G) service) for fallback services, enabling the UE to conserve time and power.

In various aspects, a PLMN manager of a user equipment searches, as part of a registration procedure, a data repository of PLMN information that includes a PLMN blocked from registration for a duration of time and determines that the PLMN is blocked from registration due to a signal-related condition (e.g., poor signal coverage or poor signal area) of a connection between the UE and a cell of the PLMN. The PLMN manager then determines, during the duration of time, that the signal-related condition between the UE and the cell of the PLMN has improved. In response to the improvement, the PLMN manager unblocks the PLMN. By so doing, the UE may reattempt registration with the unblocked PLMN at least once before the duration of time expires, which may allow the UE to register more quickly and reestablish network services.

While any number of different environments, systems, devices, and/or various configurations can implement features and concepts of the described techniques and apparatuses for adaptive PLMN management for varying network conditions, aspects of adaptive PLMN management for varying network conditions are described in the context of the following example environment, devices, configuration, systems, and methods.

Example Environment

FIG. 1 illustrates an example environment 100 in which various aspects of adaptive Public Land Mobile Network (PLMN) management for varying network conditions can be implemented. In the example environment 100, a user equipment 102 (UE 102) may communicate with or access network services provided by a PLMN 104 and/or a PLMN 106. Although illustrated as a smartphone, a UE 102 may be implemented as any suitable computing or electronic device, such as a mobile communication device, a user device, a computing device, a client device, a mobile phone, a tablet computer, a laptop computer, a communication device, an entertainment device, a gaming device, a mobile gaming console, a personal media device, a media playback device, a charging station, an Advanced Driver Assistance System (ADAS), a point-of-sale (POS) transaction system, a health monitoring device, a drone, a camera, a wearable smart-device, a navigation device, a mobile-internet device (MID), an Internet home appliance capable of wireless Internet access and browsing, an Internet-of-Things (IoT) device, a Fifth Generation New Radio (5G NR) user equipment, and/or other types of user devices.

Generally, the UE 102 communicates with one or more of base station 108, base station 110, base station 112, base station 114, or another base station (not shown) through a wireless connection or communication link. With reference to FIG. 1, the UE 102 can communicate via the PLMN 104 through a connection 116 with the base station 110 (e.g., cell of PLMN 104) or communicate via the PLMN 106 through a connection 118 with the base station 112 (e.g., a cell of PLMN 106), which may be implemented as any suitable type or combination of wireless links.

The connection 116 or the connection 118 (e.g., wireless links or wireless connections) can include a downlink of data and control information communicated from one of the base stations 108 through 114 to the UE 102, an uplink of other data and control information communicated from the UE 102 to one of the base stations 108 through 114, or both. The connection 116 or the connection 118 may include one or more wireless links or bearers implemented using any suitable communication protocol or standard, or combination of communication protocols or standards, such as Global System for Mobile Communications (GSM), Universal Mobile Telecommunications Service (UMTS), High Speed Packet Access (HSPA), Evolved HSPA (HSPA+) protocol, wideband code division multiple access (WCDMA), 3rd Generation Partnership Project Long-Term Evolution (3GPP LTE), LTE Advanced, Fifth Generation New Radio (5G NR), 5G System (5GS) mobility management (5GMM) protocol, Institute of Electrical and Electronics Engineers (IEEE) 802.11 (Wi-Fi™), IEEE 802.16 (Worldwide Interoperability for Microwave Access (WiMax™)), IEEE 802.15 (e.g., Bluetooth™), IEEE 802.15.4 (e.g., Zigbee™) Ultra-Wideband (UWB), and so forth. Multiple carrier components or wireless links of the connection 116 or the connection 118 may be aggregated in a carrier aggregation (CA) to provide a higher data rate for the UE 102.

With continuing reference to FIG. 1, the base stations 108 through 112 are each illustrated as a tower of a cellular network or wireless wide area network (WWAN). One of the base stations 108 through 112, however, may represent or be implemented as another device, radio access node, wireless communication node, or other suitable piece of equipment that facilitates wireless communication (via a wireless link) between user equipment and a communication network, such as a NodeB base station, a Next Generation Base NodeB (gNB) base station, an Enhanced NodeB (eNB) base station, an evolved NodeB (eNodeB) base station, a Global System for Mobile Communication (GSM) base station, a code-division multiple-access (CDMA) base station, a base transceiver system, a Local Access Network (LAN) router, a Wireless Local Access Network (WLAN) router, a wireless access point (WAP) in a managed (infrastructure) wireless network, a satellite, a terrestrial television broadcast tower, an access point, a peer-to-peer device, another smartphone acting as a base station, and so forth. Alternatively or additionally, the base stations 108 through 112 may be implemented in a macrocell, microcell, small cell, picocell, or the like, or any combination.

The base stations 108 through 112 (e.g., serving cells) collectively form respective Radio Access Networks (RANs) for the PLMN 104 and the PLMN 106. The RANs are illustrated in FIG. 1 as an Evolved Universal Terrestrial Access Network 120 (E-UTRAN 120) and a New Radio RAN 122 (NR RAN 122). The base stations 108 and 110 in the E-UTRAN 120 are connected to an Evolved Packet Core 124 (EPC 124) and form the PLMN 104 (or a first PLMN) with which the UE 102 may communicate. The base stations 112 and 114 in the NR RAN 122 are connected to a $5^{th}$ Generation Core 126 (5GC 126) network and form the PLMN 106 (or a second PLMN) with which the UE 102 may communicate. Although illustrated in FIG. 1 as an E-UTRAN and an NR RAN, either RAN 120 or 122 could be implemented as any form of a Radio Access Network (e.g., RAN, E-UTRAN, Next Generation Radio Access Network (NG-RAN), 5G NR RAN, NR RAN). Alternatively or additionally, although PLMN 104 and PLMN 106 are illustrated as an Evolved Packet Core network and a 5G core network, respectively, either PLMN 104 or 106 may include an EPC 124 and/or a 5G core 126.

In this example, the base stations 108 and 110 connect, at 128 and 130 respectively, to the EPC 124 via a Next Generation 2 (NG2) interface for control-plane signaling and via a Next Generation 3 (NG3) interface for user-plane data communications (e.g., 5G interfaces). Alternatively or additionally, the base stations 112 and 114 connect, at 132 and 134 respectively, to the 5GC 126 via a Single Interface 1 (S1) interface for control-plane signaling and user-plane data communications (e.g., LTE interface). In addition to connections to core networks, the base stations 108 through 114 of the respective RANs 120 and 122 may communicate with each other. For example, the base stations 108 and 110 can communicate via an inter-base station Xn interface at 136 (e.g., 5G interface) and the base stations 112 and 114 can communicate via an inter-base station X2 interface at 138 (e.g., LTE interface).

The EPC 124 may also include a Mobility and Management Entity 140 (MME 140) that provides control-plane functions such as registration and authentication of multiple UEs 102, authorization, mobility management, or the like in the E-UTRAN 120. The 5GC 126 includes an Access and Mobility Management Function 142 (AMF 142) that provides control-plane functions such as registration and authentication of multiple UEs 102, authorization, mobility management, or the like in the 5G NR RAN 122. The MME 140 and AMF 142 communicate with the base stations 108 through 114 (e.g., cells) of the RANs 120 and 122, and may also communicate with multiple UEs 102, via the base stations or serving cells. From the core networks 124 and/or 126, the UE may receive services that enable access to various data or resources (e.g., Internet access) via a respective gateway or edge router (not shown) of a network.

With reference to FIG. 1, the UE 102 also includes an adaptive PLMN manager 144 (PLMN manager 144) and an adaptive UE capability manager 146 (UE capability manager 146). In some aspects, the PLMN manager 144 and/or the UE capability manager 146 manage or direct the UE 102 when registering, or attempting to register, with one of the PLMNs 104 or 106. Although not shown in FIG. 1, the PLMN manager 144 and/or the UE capability manager 146 may include, be coupled with, or have access to components for measuring signal-related characteristics of a network, scanning for available cells or PLMNs, receiving connection parameters from a wireless network, performing an ATTACH procedure with a PLMN, performing a TAU with a PLMN, or the like. In various aspects of adaptive PLMN management, the PLMN manager 144 may unblock a PLMN from a temporary forbidden list, such as to enable registration with a PLMN in response to improved signaling conditions. Alternatively or additionally, the UE capability manager 146 may reduce or remove carrier aggregation information from a UE capability message to increase chances of successful registration with a PLMN. The uses and implementations of the PLMN manager 144 and/or UE capability manager 146 may vary in accordance with one or more aspects and are described throughout the disclosure.

Example Devices

Figure 2:
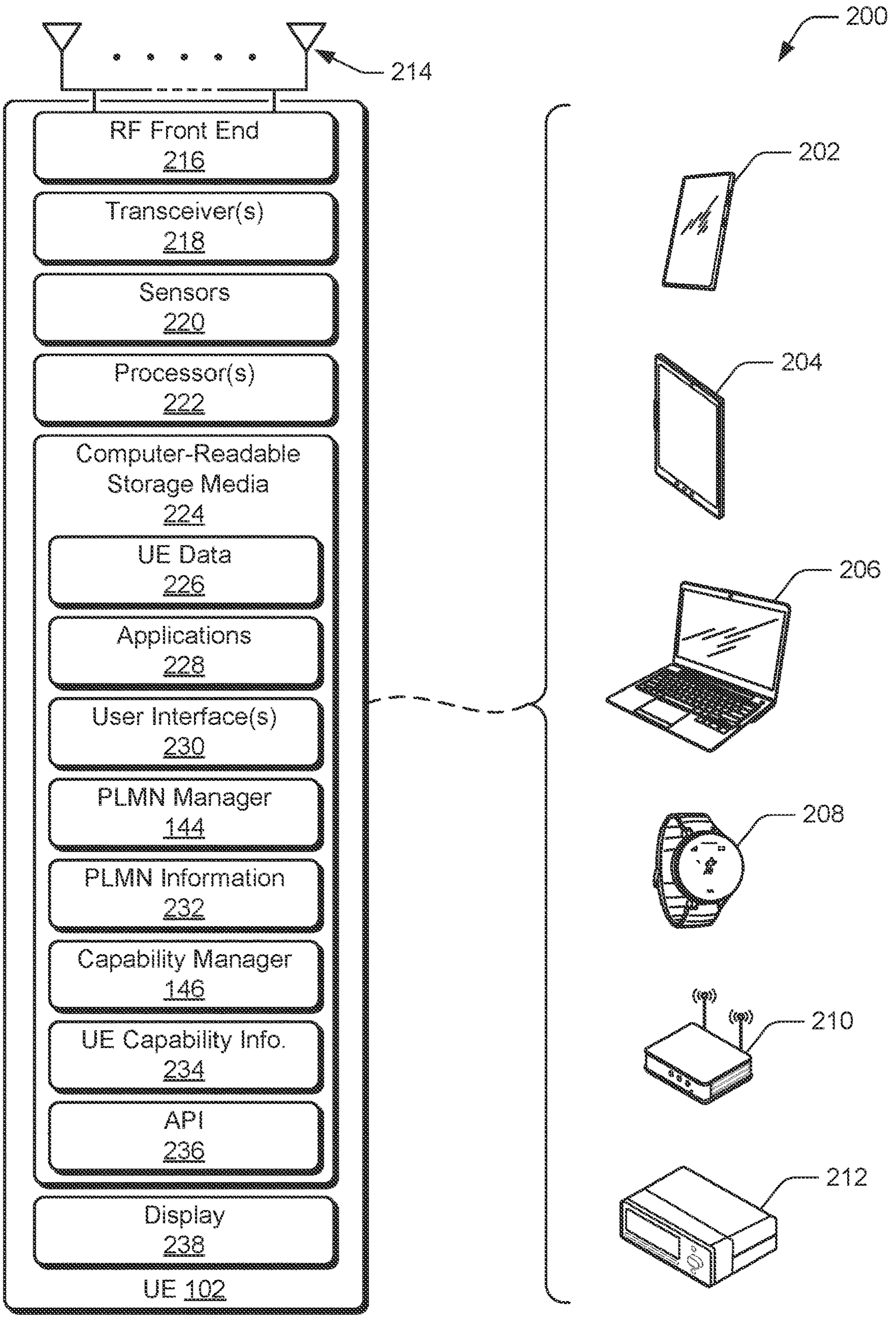
FIG. 2 illustrates a device diagram of an example user equipment (UE) that includes a PLMN manager and a UE capability manager in accordance with one or more aspects.

FIG. 2 illustrates a device diagram 200 of an example UE 102. The UE 102 may be implemented as any suitable device, some of which are illustrated as a smart-phone 202, a tablet computer 204, a laptop computer 206, a wearable computing device 208 (e.g., smart-watch), a broadband router 210 (e.g., mobile hotspot), and automotive computing system 212 (e.g., navigation and entertainment system). Although not shown, the UE 102 may also be implemented as any of a mobile station (e.g., fixed- or mobile-STA), a mobile communication device, a user device, a client device, a mobile phone, an entertainment device, a gaming device, a mobile gaming console, a personal media device, a media playback device, an ADAS, a POS transaction system, a health monitoring device, a drone, a camera, a wearable smart-device, a navigation device, a MID, an Internet home appliance capable of wireless Internet access and browsing, an IoT device, a 5G NR user equipment, and/or other types of user devices. The UE 102 may include additional functions, components, or interfaces omitted from FIG. 2 for the sake of clarity or visual brevity.

In this example, the UE 102 includes one or more antennas 214, a radio frequency front end 216 (RF front end 216), and at least one transceiver 218 for communicating with base stations 108 through 114 of the PLMNs 104 and 106, other wireless networks (e.g., WLAN), or other wireless communication-enabled devices. Alternatively or additionally, any of the components of the UE 102 may be implemented in whole or part as hardware logic or circuitry integrated with or separate from other components of the UE 102.

The transceiver(s) 218 may include one or more of an LTE transceiver, a 5G NR transceiver, other types of transceivers are configured to operate on a wide area network or cellular network, and/or another transceiver(s). The RF front end 216 of the UE 102 can couple or connect the transceiver(s) 218 to the antennas 214 to facilitate various types of wireless communication, such as acquiring and maintaining a connection with one of the base stations 108 through 114 of the PLMN 104 or PLMN 106. For example, the PLMN manager 144 of the UE 102 may utilize a connectivity scan to search for network cells (e.g., base stations) of the PLMN 104 and/the PLMN 106 that are available for acquisition. The antennas 214 of the UE 102 may include an array of multiple antennas that are configured similarly or differently from each other. The antennas 214 and the RF front end 216 can be tuned to, and/or be tunable to, one or more frequency bands defined by wireless communication standards and implemented by the transceiver(s) 218 of the UE 102.

The UE 102 may also include one or more sensors 220, which enable the UE 102 to sense various properties, variances, stimuli, or characteristics of an environment in which UE 102 operates. For example, the sensors 220 may include various motion sensors, radar sensors, ambient light sensors, acoustic sensors, capacitive sensors, infrared sensors, temperature sensors, or magnetic sensors. Alternatively or additionally, the sensors 220 may enable interaction with, or receive input from, a user of UE 102, such as through touch sensing or proximity sensing. In some aspects, the UE 102 or PLMN manager 144 can monitor a sensor 220, such as to receive input or feedback via one of the sensors 220. Data provided by the sensors 220 is accessible to other entities of the UE 102, such as the PLMN manager 144. Although not shown, the sensors 220 may also include a Global Navigation Satellite System (GNSS) module, gyros, accelerometers, magnetometers, micro-electromechanical systems (MEMS), internal/external device temperature sensors, resistive touch sensors, or input sensing-logic associated with hardware switches (e.g., keyboards, snap-domes, or dial-pads), and so on.

In some aspects, the PLMN manager 144 or UE capability manager 146 can determine a motion state of the UE 102, such as a stationary state of no movement or a mobility state in which the UE is moving. For example, an accelerometer or gyroscope can sense movement or orientation of the UE 102 in any suitable aspect, such as in one-dimension, two-dimensions, three-dimensions, multi-axis, combined multi-axis, and the like. Alternatively or additionally, a positional sensor, such as a GNSS, may indicate a distance traveled, rate of travel, or an absolute or relative position of the UE 102. Capacitive or proximity sensors may indicate that a position of the UE 102 is static or changing with respect to a user (e.g., holding or reorienting the UE). Further, other environmental sensors may indicate an internal or external temperature of the UE 102, as well as humidity. As such, the PLMN manager 144 or the UE capability manager 146 may access data from the sensors 220 and alter, based on the sensor data (e.g., motion, orientation, temperature, proximity), UE capability information or PLMN status (e.g., blocked or forbidden to unblocked) of the UE 102 in accordance with one or more aspects of adaptive connection management.

The UE 102 also includes processor(s) 222 and computer-readable storage media 224 (CRM 224). The processor(s) 222 may be a single core processor or a multiple core processor composed of a variety of materials, such as silicon, polysilicon, high-K dielectric, copper, and so on. The computer-readable storage media 224 is configured as storage, and thus does not include transitory signals or carrier waves. The CRM 224 may include any suitable memory or storage device such as random-access memory (RAM), static RAM (SRAM), dynamic RAM (DRAM), non-volatile RAM (NV-RAM), read-only memory (ROM), or Flash memory usable to store device data 226 of the UE 102.

The UE data 226 may include user data, multimedia data, beamforming codebooks, applications 228, user interface(s) 230, and/or an operating system of the UE 102, which are executable by processor(s) 222 to enable user-plane communication, control-plane signaling, and user interaction with the UE 102. The user interface 230 can be configured to receive inputs from a user of the UE 102, such as to receive input from a user that may define and/or facilitate one or more aspects of adaptive PLMN management. The user interface 230 can include a graphical user interface (GUI) that receives the input information via a touch input. In other instances, the user interface 230 includes an intelligent assistant that receives the input information via an audible input or speech. Alternatively or additionally, the operating system of the UE 102 may be maintained as firmware or an application on the CRM 224 and executed by the processor(s) 222.

The CRM 224 also includes a PLMN manager 144, PLMN information 232, a UE capability manager 146, and UE capability information 234. In some cases, the UE 102 or the PLMN manager 144 accesses the PLMN information 232 to search for PLMNs (e.g., known or preferred PLMNs) or to obtain information for a PLMN. The PLMN information 232 may be implemented as one or more data repositories, lists, or databases of information for various PLMNs, such as PLMN 104 and PLMN 106. The PLMN information 232 may include an acquisition database of identifiers of previously acquired cells or PLMNs. The PLMN information 232 may also include a temporary forbidden PLMN list of one or more PLMNs blocked from registration. Generally, PLMNs with which registration fails a predefined number to times (e.g., five failed registration attempts) are placed on the temporary forbidden PLMN list. A PLMN may remain on the temporary forbidden PLMN list until a timer (e.g., a T3402 timer) expires. In some cases, the timer is set for a predefined duration of time (e.g., 12 minutes) or configured based on a time parameter provided by a wireless network operator.

The UE capability information 234 may include parameters or other information regarding wireless communication capabilities of the UE 102, such as supported profiles, carriers, bands, layer configurations, radio access technologies (RATs), or the like. In some aspects, the UE capability information 234 also includes carrier aggregation (CA) information that describes CA band combinations supported by the UE 102. Generally, the CA band combinations include a configuration name (e.g., CA_1C (B1+B1)), a CA type (e.g., intra-band or inter-band), a number of carrier components, frequency bands (e.g., LTE bands), a maximum aggregated bandwidth, or the like. In various aspects, the UE capability manager 146 may modify or reduce a number of CA band combinations of a UE capability message effective to reduce a size or length of the UE capability message. By so doing, the UE capability manager 146 may increase the probability of successful registration with a PLMN over a low throughput connection with a base station or cell of the PLMN, such as in poor signaling conditions or poor cell coverage.

In some aspects, the PLMN manager 144 or the UE capability manager 146 can be implemented with machine learning or a machine-learned model that is trained to receive input data of one or more types (e.g., network- or signal-related characteristics) and, in response, provide output data of one or more types (e.g., modified UE capability information messages, signal-related thresholds, or timers). For example, any of the thresholds used or determined by the PLMN manager 144 and/or CA band combination reductions of the UE capability manager 146 can be derived from machine learning algorithms with data collected by the UE 102 while in the field or environment of use.

In some implementations, the input data can include one or more features that are associated with an instance of a UE 102, such as a current external temperature, internal temperature (e.g., of the UE), humidity, UE orientation, UE mobility state, active antenna(s), blocked antenna(s), signal-related parameters, a number of failed registration attempts, sizes of previously successful UE capability messages with reduced CA combinations, or the like. In some implementations, the one or more features associated with the instance or example can be organized into a feature vector. In some implementations, the output data can include one or more predictions or inferences. Thus, given features associated with a particular instance of the UE 102 or PLMN manager 144, a machine-learned model can output a prediction or adjustment for such instance based on the features, which may include adaptive signal-related thresholds (e.g., for signaling conditions), adaptive CA band combination reduction for UE capability messages, adaptive parameters for PLMN unblocking, or the like.

By way of example, the machine-learned model can be or include one or more of various different types of machine-learned models. In particular, in some implementations, the machine-learned model can perform classification, regression, clustering, anomaly detection, recommendation generation, and/or other tasks. In some implementations, the machine-learned model can provide output data in the form of one or more recommendations, adjustments, or alterations. In some cases, the machine-learned model is included in or embodied in the PLMN manager 144 or the UE capability manager 146 of a UE 102.

As an example, given input data that describes previous outcomes for certain entities (e.g., a score, ranking, signal strength, or rating indicative network connection quality), the machine-learned model can output a suggestion or recommendation of one or more additional entities or parameters that, based on the previous outcomes, are expected to have a desired outcome, such as quicker network registration when moving to a good signal area or successful registration with a PLMN in a poor signal area using modified UE capability messages. As one example, given previously successful registration with modified UE capability messages (e.g., how many CA combinations were previously removed for successful registration), a UE capability manager can output a suggestion or recommendation for how many or which CA combinations to remove from a UE capability message to reduce a size of the message such that registration with the PLMN is likely to succeed in a poor signal area.

Aspects and functionalities of the UE 102 may be operated via operating system controls presented through at least one application programming interface 236 (API 236). In some aspects, the PLMN manager 144, the UE capability manager 146, or an application of the UE 102 accesses an API 236 (or an API service) of the UE 102 to control aspects and functionalities of the user equipment or transceivers 218. For example, the PLMN manager 144 can access low-level network enable/connection settings of the UE 102 to implement aspects of adaptive PLMN management, such as to identify (e.g., flag) a blocked PLMN as being blocked due to signal-related conditions (e.g., low received signal strength), verify or recheck the signal-related condition, or unblock the PLMN. The CRM 224 of the UE 102 may also include a user equipment manager (not shown), which can be implemented in whole or in part as hardware logic or circuitry integrated with or separate from other components of the UE 102. In at least some aspects, the user equipment manager configures the RF front end 216 and/or the transceiver(s) 218 to implement the techniques for adaptive PLMN management as described herein.

The UE 102 also includes a display 238 for displaying and/or providing information to a user. For example, through the display 238, the UE 102 may provide the user with information regarding available network cells, a connection status of the UE 102 (e.g., performing an ATTACH or TAU procedure), enable user-initiated cell reselection, an indication of a blocked PLMN timer, an indication that network capabilities are reduced yet functional, or the like. Based on such information, a user may choose, through the user interface 230, to initiate a registration procedure, attempt to resend a UE capability message with increased CA band combinations, or adjust thresholds and/or offsets by which a connection is determined as poor (e.g., received signal power less than −117 to −120 dBm) or good (e.g., received signal power equal to or greater than −110 dBm).

Figure 3:
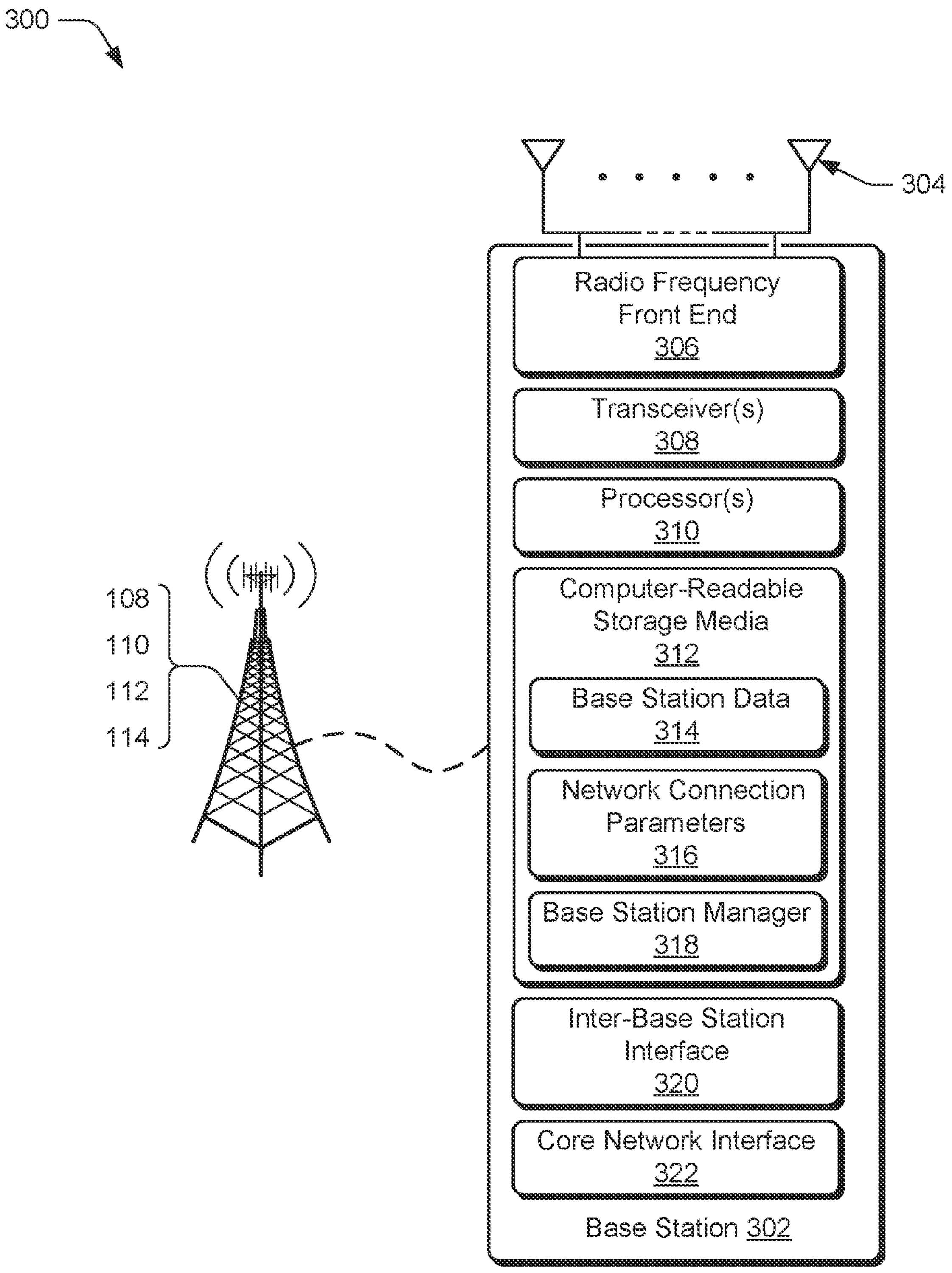
FIG. 3 illustrates a device diagram of an example base station device capable of facilitating PLMN access in accordance with one or more aspects.

FIG. 3 illustrates a device diagram 300 of an example base station 302, which may represent or correspond to one of the base stations 108 through 114 as described with reference to FIG. 1. The base station 302 of the example device diagram 300 may include additional functions, components, and/or interfaces that are omitted from FIG. 3 for the sake of clarity or visual brevity. In the device diagram 300, the base station 302 is generally illustrated as a single network node (e.g., a gNode B or serving cell). The functionality of the base station 302 and/or base stations 108 through 114 may be distributed across multiple network nodes or devices and may be distributed in any fashion suitable to perform the functions described herein.

The base station 302 includes antennas 304, a radio frequency front end 306 (RF front end 306), and one or more transceivers 308 for communicating with or providing connections for the UE 102. The RF front end 306 of the base station 302 can couple or connect the transceiver(s) 308 to the antennas 304 to facilitate various types of wireless communication. The antennas 304 of the base station 302 may include an array of multiple antennas that are configured similar to or differently from each other. The antennas 304 and the RF front end 306 can be tuned to, and/or be tunable to, one or more frequency band defined by communication standards and implemented by the transceiver(s) 308.

The base station 302 also includes processor(s) 310 and computer-readable storage media 312 (CRM 312). The processor(s) 310 may be a single core processor or a multiple core processor composed of a variety of materials, such as silicon, poly silicon, high-K dielectric, copper, and so on. The CRM 312 may include any suitable memory or storage device such as RAM, SRAM, DRAM, NV-RAM, ROM, or Flash memory usable to store base station data 314 of the base station 302. The base station data 314 may include network scheduling data, radio resource management data, beamforming codebooks, applications, and/or an operating system of the base station 302, which are executable by processor(s) 310 to enable communication with the UE 102.

The CRM 312 also includes network connection parameters 316 and a base station manager 318. In some aspects, the network connection parameters 316 are predefined or configured by a wireless network provider to specify or indicate one or more parameters or thresholds useful by user equipment to register (e.g., ATTACH or TAU) with a network cell or base station of a wireless network. For example, the network connection parameters may specify, for one or more network cells (e.g., base stations), available frequency bands, timer settings, frequency band priority, minimum signal strength for network cell connection, minimum bit- or packet-error rates for maintaining a connection, or the like. As described herein, the UE 102 may receive network connection parameters 316 from the base station 302 or alter the network connection parameters 316 in accordance with one or more aspects. Alternatively or additionally, the UE 102 may be preconfigured with network connection parameters 316 or receive the network connection parameters 316 via a different data interface, such as a WLAN or a wireless personal area network (WPAN).

In some aspects, the base station manager 318 configures the transceivers 308 for communication with the UE 102 or for communication with a core network. The base station 302 includes an inter-base station interface 320, such as an Xn and/or X2 interface, which the base station manager 318 configures to exchange user-plane and control-plane data between another base station (e.g., base station 108, 110, 112, or 114), and to manage the connection of the base station 302 with the UE 102. The base station 302 also includes a core network interface 322 that the base station manager 318 can configure to exchange user-plane and control-plane data with core network 124 or 126, core network functions, or other core-linked entities. This core network interface 322 may include interfaces such as the NG2 interface, NG3 interface, and/or S1 interface as described herein with reference to FIG. 1. Alternatively or additionally, the components of the base station 302, such as the base station manager 318, may be implemented in whole or part as hardware logic or circuitry integrated with or separate from other components of the base station 302.

Figure 4:
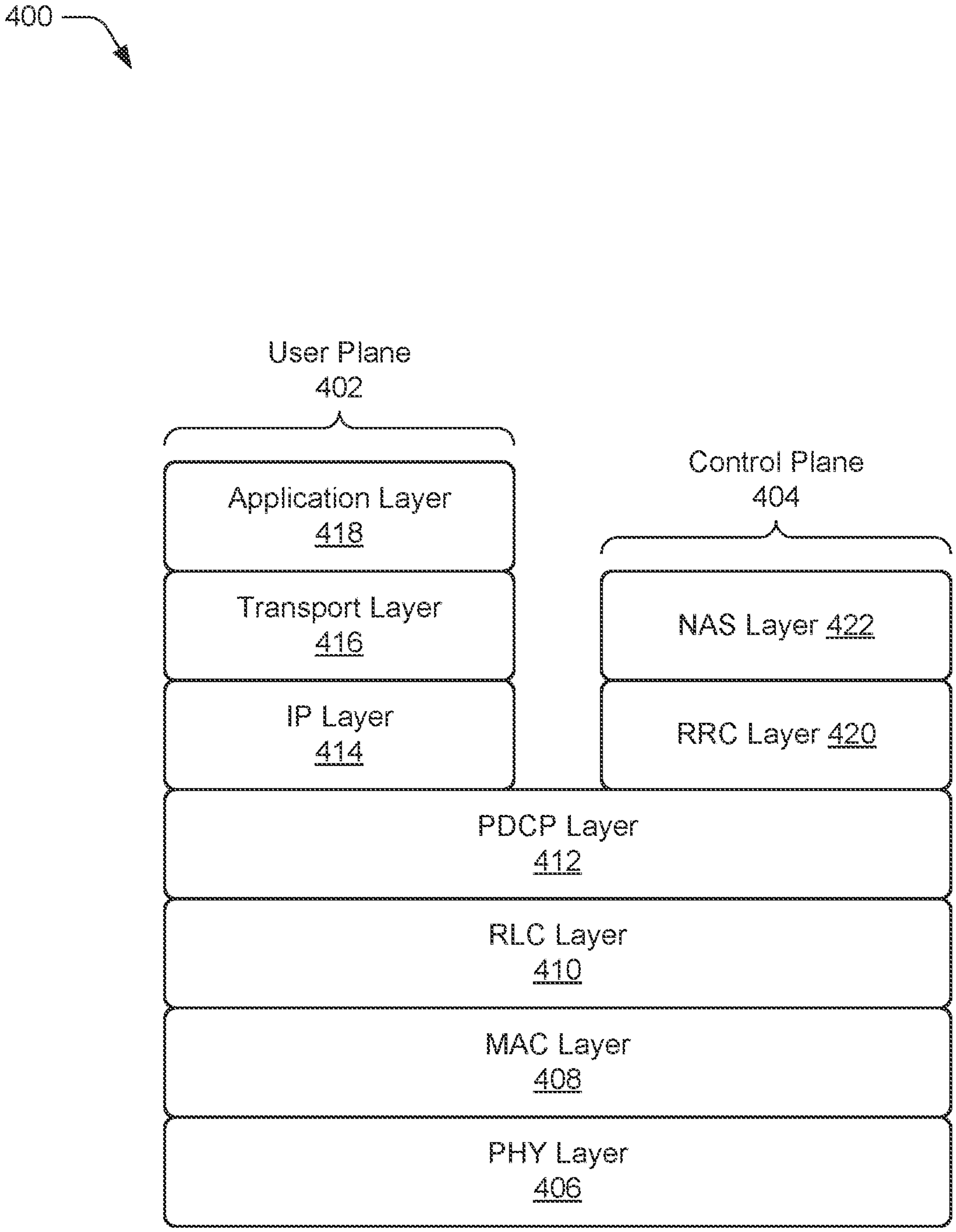
FIG. 4 illustrates a diagram of an example network protocol stack through which a UE may communicate with entities of a PLMN in accordance with one or more aspects.

FIG. 4 illustrates a diagram of an example network protocol stack 400 stack through which a UE may communicate with entities of a PLMN in accordance with one or more aspects. Generally, the network protocol stack 400 (stack 400) characterizes a communication system of the example environment 100, in which the UE 102 communicates with entities, such as cells or core networks, of the PLMNs 104 and 106. In reference to the network protocol stack, the terms "upper layer" and "lower layer" are relative to one another, with each layer in the network protocol stack being an "upper layer" to a layer lower in the protocol stack (a "lower layer"). For example, an upper layer may correspond to a non-access stratum layer and/or a lower layer may correspond to a media access control layer or radio link control layer.

In this example, the network protocol stack 400 includes a user plane 402 and a control plane 404. Upper layers of the user plane 402 and the control plane 404 share common lower layers in the network protocol stack 400. Wireless devices, such as the UE 102 or the base stations 108 through 114, implement each layer as an entity for communication with another device using respective protocols defined for the layer. For example, a UE 102 uses an RRC entity to communicate to a peer RRC entity in a base station 108 using an appropriate RRC protocol or RRC connection.

The shared lower layers include a physical layer 406 (PHY layer 406), a media access control layer 408 (MAC layer 408), a radio link control layer 410 (RLC layer 410), and a packet data convergence protocol layer 412 (PDCP layer 412). Generally, the physical layer 406 provides hardware specifications for devices that communicate with each other and the MAC layer 408 specifies how data is transferred between devices. The RLC layer 410 may provide data transfer services to higher layers in the network protocol stack 400 and the PDCP layer 412 provides data transfer services to higher layers in the network protocol stack 400.

Above the PDCP layer 412, the network protocol stack 400 of the wireless network splits into the user plane 402 and the control plane 404. Layers of the user plane 402 include an Internet Protocol layer 414 (IP layer 414), a transport layer 416, and an application layer 418, which transfers data using the wireless connection 116 or 118. Although not shown, the user plane may also include an optional service data adaption protocol (SDAP) layer for Quality of Service (QoS) flow implementation and management in 5G NR networks. Generally, the IP layer 414 specifies how the data from the application layer 418 is transferred to a destination node. The transport layer 416 may verify that data packets intended to be transferred to the destination node reached the destination node, using either transmission control protocol (TCP) or user datagram protocol (UDP) for data transfers by the application layer 418. In some implementations, the user plane 402 may also include a data services layer (not shown) that provides data transport services to transport application data, such as IP packets including web browsing content, video content, image content, audio content, or social media content, and so forth.

The control plane 404 includes a radio resource control layer 420 (RRC layer 420) and a non-access stratum layer 422 (NAS layer 422). The RRC layer 420 establishes and releases radio connections and radio bearers, broadcasts system information, or performs power control. For example, during registration with one of PLMN 104 or PLMN 106, the UE 102 may request an RRC connection by sending an RRC Connection Request message to one of base stations 108 through 114 (e.g., an eNB or cell) with an establishment cause field (e.g., "mobile originating signaling" value) to request an ATTACH, a DETACH, or perform a TAU. The UE 102 may then use the RRC connection to initiate registration with the PLMN 104 or the PLMN 106, such as by transmitting an ATTACH request message or TAU message to a network core via the NAS layer 422. As noted, poor cell coverage or weak signal for the connection may result in failure of a registration attempt, which may be detected as a release of the RRC connection by the network or a registration failure due to lower layer causes (e.g., radio link failure) or the like.

The NAS layer 422 provides support for mobility management and packet data bearer contexts between the UE 102 and entities or functions in the core network, such as the MME 140 of the EPC 124 or the AMF 142 of the 5GC 126. In the UE 102, each layer in both the user plane 402 and the control plane 404 of the network protocol stack 400 interacts with a corresponding peer layer or entity in a cell, a core network entity or function, and/or a remote service, to support user applications and control operation of the UE 102 in the RAN 120 or RAN 122.

Figure 5:
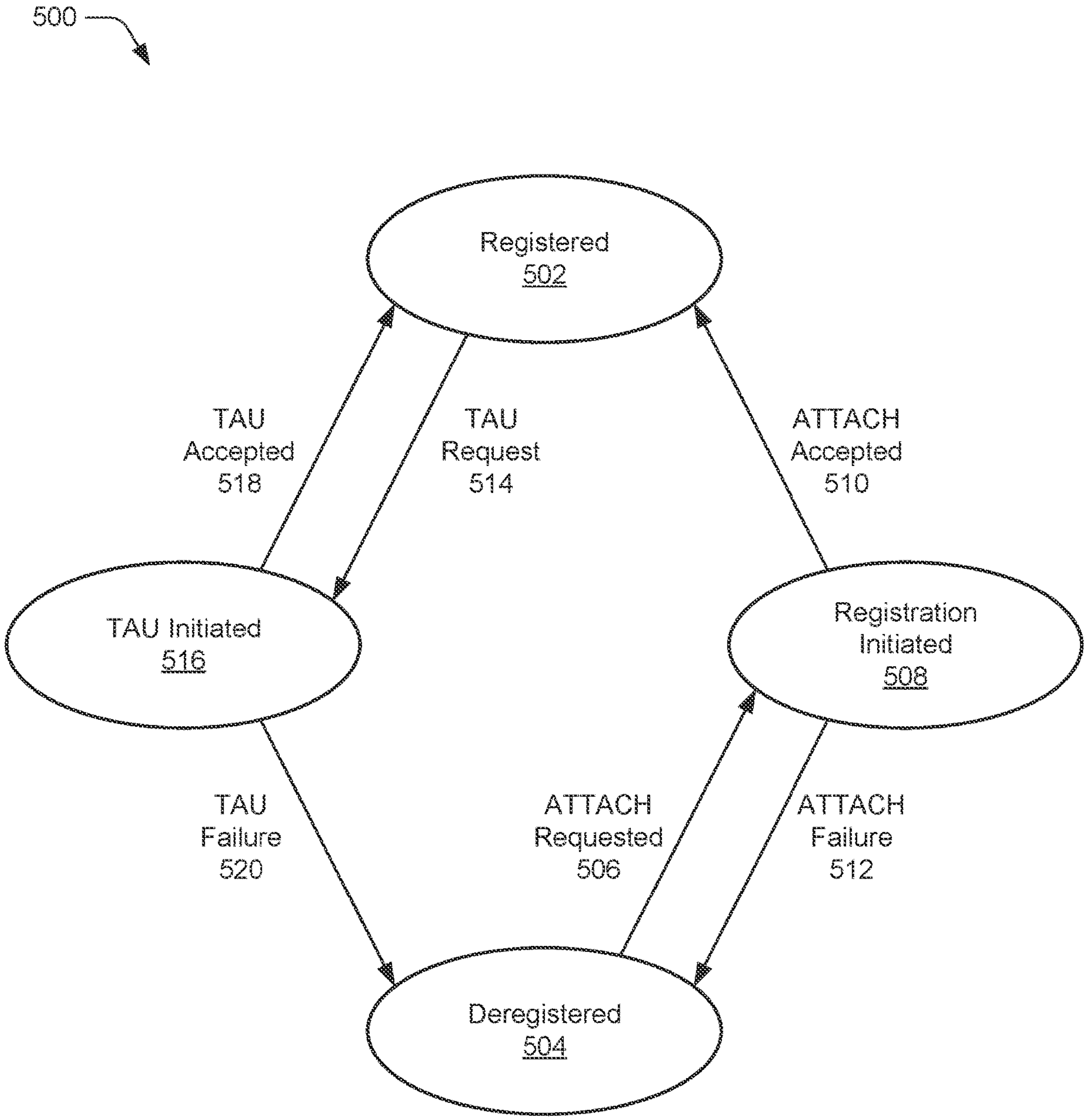
FIG. 5 illustrates a diagram of example registration states between which a UE may transition during a network ATTACH or tracking area update (TAU) procedure.

FIG. 5 illustrates a diagram of example registration states 500 between which a UE may transition during a network ATTACH procedure or TAU procedure. As described with reference to FIG. 4, to communicate with a wireless network, the user equipment 102 utilizes an RRC procedure to establish a radio connection to the network via a cell (e.g., a base station, a serving cell). Upon establishing the radio connection to the network via one of the base stations 108 through 114, the UE 102 enters a connected mode (RRC connection) in which the radio connection with the base station is active. While connected to the network through the active RRC connection, the UE can initiate a registration procedure to register with the network, such as one of the PLMN 104 or the PLMN 106. For the sake of clarity or visual brevity, the example registration states 500 do not include all possible UE states or transitions, thus the UE 102 may transition to or from other states (or sub-states) that are not shown in FIG. 5.

Generally, the UE 102 may enter or maintain a registered state 502 through a registration procedure, such as an initial ATTACH procedure or TAU procedure. As shown in FIG. 5, a UE 102 in a deregistered state 504 may request an ATTACH at 506 and enter a registration initiated state 508. From the registration initiated state 508, the UE 102 may complete registration with the network if the ATTACH request is accepted by the network at 510 (e.g., registration successful), in response to which the UE 102 enters the registered state 502. Alternatively, an ATTACH failure at 512 may return the UE 102 to the deregistered state 504. The ATTACH failure may occur during or after transmission of a UE capability message to the network (e.g., as part of the ATTACH request) during the ATTACH procedure. In some aspects, the PLMN manager 144 or UE capability manager 146 determines that the ATTACH failure 512 is associated with or caused by low throughput or a signal-related condition (e.g., weak signaling or poor network/cell coverage). For example, the UE capability manager 146 may determine that an amount of time between transmission of a UE capability message and release of the RRC connection is greater than a predefined value (e.g., three seconds). Alternatively or additionally, the PLMN manager 144 or UE capability manager 146 can compare a signal-related characteristic (e.g., reference signal receive power (RSRP) or reference signal receive quality (RSRQ)) to a threshold (e.g., −120 dBm) to determine if the ATTACH failure is due to a signal-related condition (poor signal strength).

For a TAU, a UE 102 in the registered state 502 may request a TAU at 514 and enter a TAU initiated state 516. From the TAU initiated state 516, the UE 102 may complete registration with the network if the TAU request is accepted by the network at 518, in response to which UE 102 enters or returns at the registered state 502. Alternatively, a TAU failure at 520 causes the UE 102 to enter the deregistered state 504. In some aspects, the PLMN manager 144 or UE capability manager 146 determines that the TAU failure 520 is associated with or caused by low throughput or a poor signaling condition. For example, the UE capability manager may determine that an amount of time between transmission of a UE capability message and release of the RRC connection is greater than a predefined value (e.g., two to four seconds). Alternatively or additionally, the PLMN manager 144 or UE capability manager 146 can compare a signal-related characteristic (e.g., RSRP or RSRQ) to a threshold (e.g., −117 dBm) to determine if the TAU failure is due to a signal-related condition (e.g., poor signaling).

Example Methods

Example method 600 and example methods 800 through 1100 are described with reference to FIG. 6 through FIG. 11B in accordance with one or more aspects of adaptive PLMN management for varying network conditions. Generally, method 600 and methods 800 through 1100 illustrate sets of operations (or acts) performed in, but not necessarily limited to, the order or combinations in which the operations are shown herein. Further, any of one or more of the operations may be repeated, combined, reorganized, omitted, or linked to provide a wide array of additional and/or alternative methods. In portions of the following discussion, reference may be made to example wireless network environment 100 of FIG. 1, example devices of FIGS. 2 and 3, example systems of FIGS. 12 through 14, and/or entities detailed in FIG. 1, reference to which is made for example only. The techniques and apparatuses described in this disclosure are not limited to embodiment or performance by one entity or multiple entities operating on one device.

Figure 6:
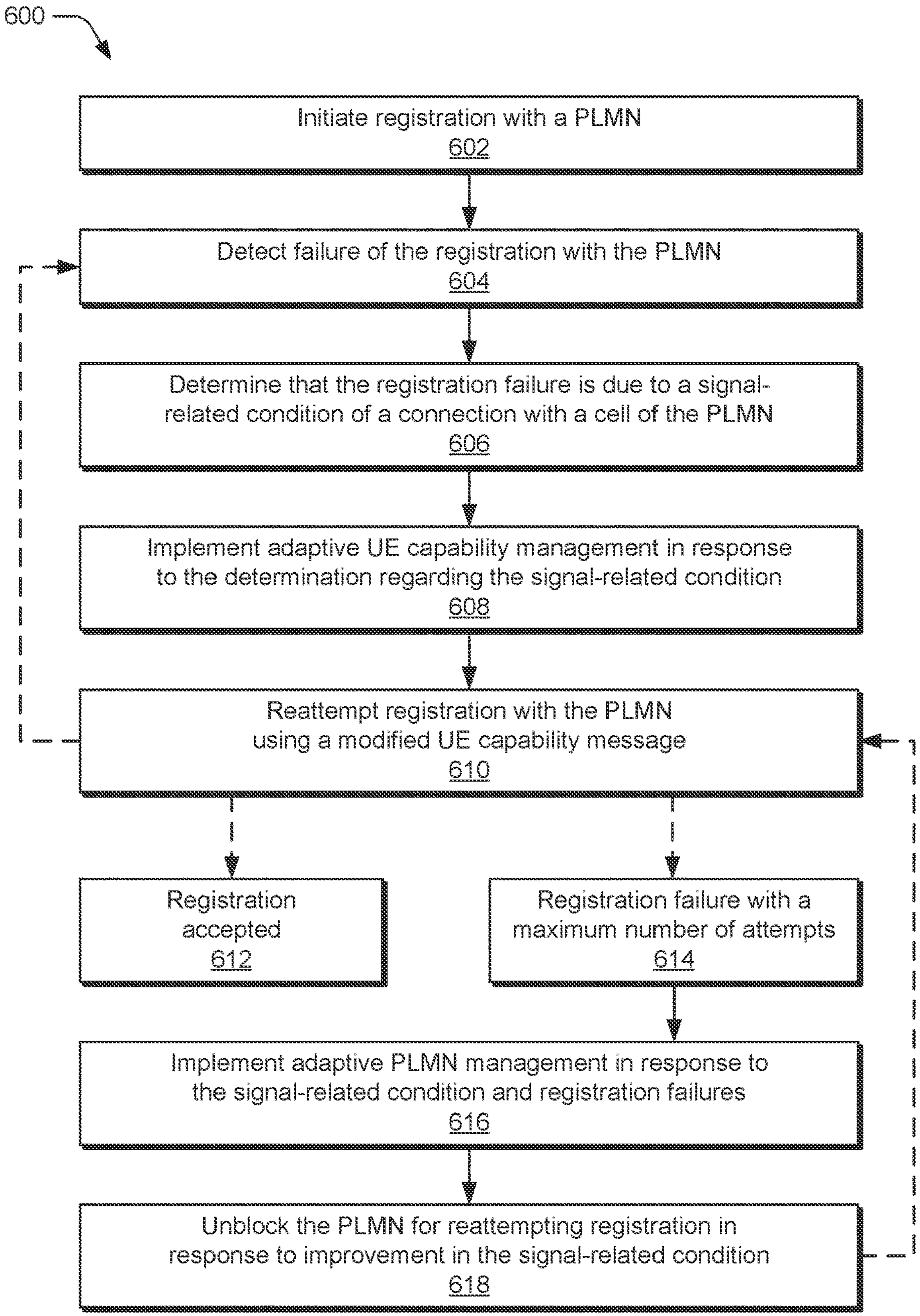
FIG. 6 illustrates an example method for PLMN registration in which aspects of adaptive UE capability management or adaptive PLMN management may be implemented.

FIG. 6 illustrates an example method 600 for PLMN registration in accordance with one or more aspects. Generally, the method 600 may implement adaptive UE capability management or adaptive PLMN management to enable registration with a PLMN in varying (e.g., improving) or marginal (e.g., poor signaling) network conditions. In some aspects, operations of the method 600 are implemented by or with a PLMN manager 144, UE capability manager 146, PLMN information 232, and/or UE capability information 234 of the user equipment 102.

At 602, a UE initiates registration with a public land mobile network (PLMN). The registration with the PLMN may include an ATTACH request or tracking area update (TAU) request. In some cases, the ATTACH request or TAU request includes a UE capability message of bands, radio access technologies (RATs), and/or carrier aggregation (CA) band combinations supported by the UE. Alternatively or additionally, the registration may include establishing an RRC connection with a cell or base station of the PLMN.

Figure 7:
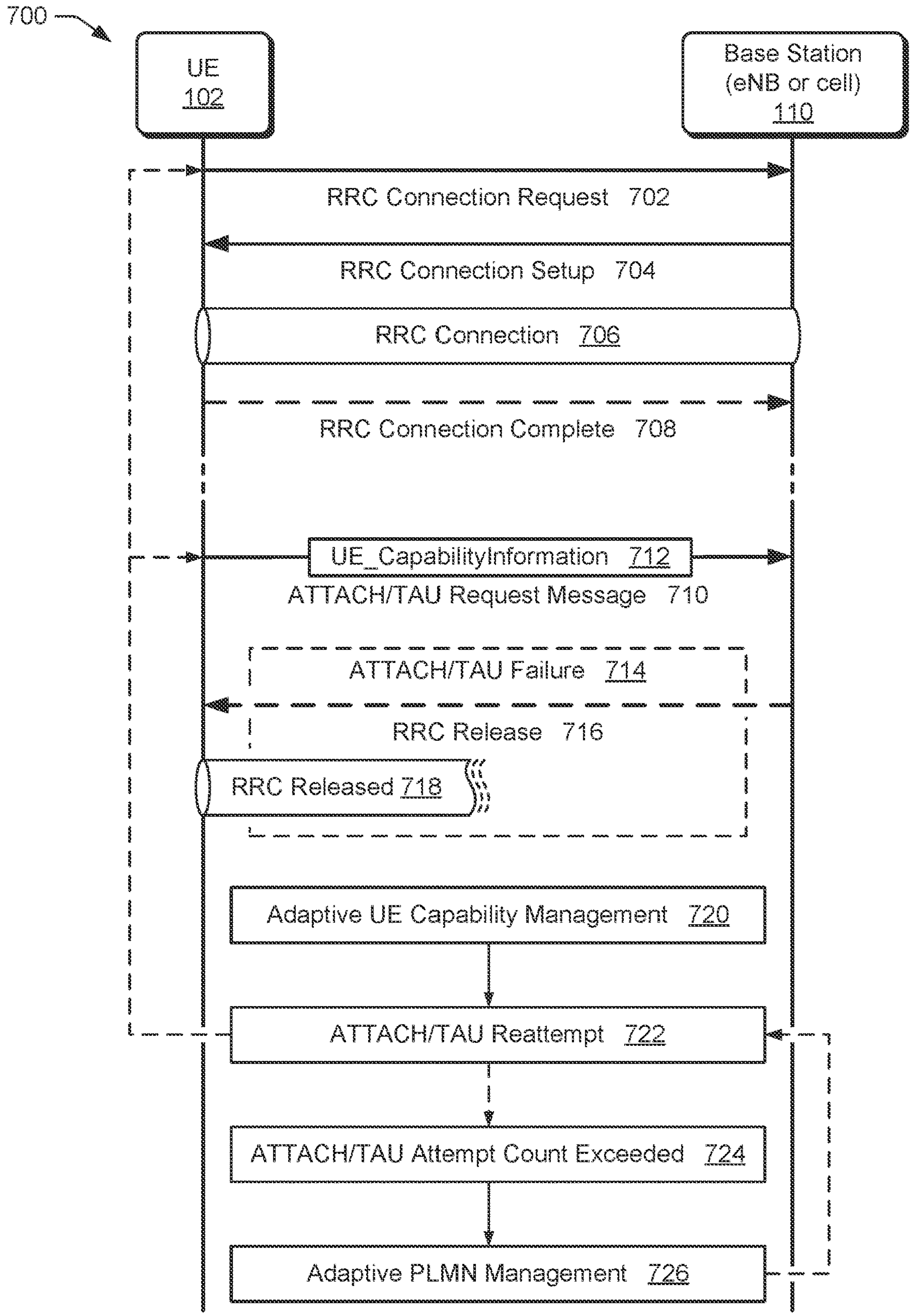
FIG. 7 illustrates an example message sequence diagram of PLMN registration m which aspects of adaptive UE capability management or adaptive PLMN management may be implemented.

By way of example, consider FIG. 7, which illustrates an example message sequence diagram for PLMN registration in accordance in one or more aspects. Here, assume that the UE 102 is attempting to register with the base station 110 of the PLMN 104 to access network services. In order to register, the UE 102 sends an RRC connection request message 702 to the base station 110 (eNB or cell) of the PLMN 104. The UE 102 then receives an RRC connection setup message 704 from the base station 110 that includes radio resource configuration information (not shown). With the radio resource configuration information provided by the base station 110, the UE establishes the RRC connection 706 and may send an RRC connection complete message 708 (e.g., if sent separate from an ATTACH request or TAU request).

With reference to FIG. 7, the UE 102 then sends a request for registration, such as an ATTACH request message or TAU request message at 710 using the active RRC connection 706. The ATTACH request message or the TAU request message sent to the base station also includes a UE_CapabilityInformation message 712 that describes the bands, radio access technologies (RATs), and/or carrier aggregation band combinations supported by the UE. As noted, the UE_CapabilityInformation message 712 may be of considerable size due to a number of carrier aggregation band combinations supported by the UE 102.

Returning to FIG. 6, the UE detects a failure of the registration with the PLMN at 604, which may include failure of an ATTACH request or failure of a TAU request. The registration failure may include a release of the RRC connection, radio link failure, or failure due to a lower layer cause. In some cases, the UE may determine that an amount of time between transmission of a UE capability message and release of the RRC connection is greater than a predefined value (e.g., three seconds). This may indicate that the UE was unable to successfully transmit the entire UE capability message to the network within a guard time. In the context of the present example, the ATTACH request or TAU request failure is detected at 714 when an RRC release message 716 is received from the base station 110 and the RRC connection is released at 718 by the UE 102.

At 606, the UE determines that the registration failure is due to a signal-related condition of a connection with a cell of the PLMN. The UE may measure or monitor a signal-related characteristic of the connection with the cell of the PLMN. In some cases, the UE compares the signal-related characteristic to a threshold (e.g., −110 dBm, −115 dBm, or −120 dBm) to determine a signaling state (e.g., poor signaling) or network conditions (e.g., poor or marginal conditions) associated with the cell of the PLMN. The signal-related characteristic may include one or more of a received signal strength, a received signal quality, a reference signal receive power, a reference signal receive quality, a received signal strength indicator, a carrier-to-interference ratio, a signal-to-noise ratio, a bit-error rate, or a packet-error rate.

At 608, the UE implements adaptive UE capability management in response to the determination regarding the signal-related condition. Generally, the UE may implement adaptive UE capability management in response to determining that the registration failure is due to or associated with poor signaling, marginal network conditions, or poor coverage provided by the cell. In some aspects, the UE predicts (e.g., through machine learning) or estimates a number of CA band combinations that can be successfully transmitted to the network, such as based on CA band combinations sent in previously successful registration attempts.

The UE then reduces or removes CA information (e.g., one or more combinations of CA bands) from the UE capability message to provide a modified capability message that is smaller in size. In some cases, the CA information is reduced based on the prediction or estimate by the UE. In other cases, reductions of the CA information may be predetermined, such as by half for each iteration of reattempted registration. By so doing, the UE may increase chances of successful registration with a PLMN when reattempting registration with the modified capability message. Continuing the ongoing example, the UE 102 implements adaptive UE capability management at 720 to reduce an amount of CA information in the UE_CapabilityInformation message 712, which decreases the size of the message.

At 610, the UE reattempts registration with the PLMN using the modified UE capability message. This may include transmitting another ATTACH request or TAU request with the modified UE capability message that includes a reduced number or subset of CA information. The UE may reattempt registration multiple times up to a threshold for a number of maximum attempts or failures (e.g., five attempts or failures). With each iteration of adaptive UE capability management, the UE may remove additional CA information with each registration reattempt. Alternatively or additionally, the UE may remove all CA information from the registration request, such as on a final attempt for registration (e.g., fifth attempt).

With reference to FIG. 7, UE 102 reattempts registration at 722 for an ATTACH or TAU with the PLMN 104. To do so, the UE 102 may reestablish the RRC connection 706 (if needed) and send another ATTACH request or TAU request. The ATTACH request or TAU request of the registration reattempt includes the modified UE_Capabilityinformation message with a subset or fewer carrier aggregation band combinations than previous requests. As noted, the UE 102 may repeat multiple iterations of adaptive UE capability management, such that subsequent registration requests include fewer and fewer CA band combinations to iteratively improve the probability of successful registration.

Returning to FIG. 6, the method 600 may proceed to 612 at which registration is accepted by the PLMN or proceed to 614 is registration is unsuccessful. At 612, the successful registration can be a result of reattempting registration with modified UE capability messages that include reduced or removed CA information. Generally, adaptive EU capability management may enable user equipment to complete registration using modified UE capability messages in marginal or poor signaling conditions, which typically prevent registration due to low connection throughput.

At 614, the UE determines that registration has failed with a maximum number of attempts. In some aspects, in response to the maximum number of attempts, the PLMN is blocked from registration by adding the PLMN to a temporary PLMN forbidden list. In the context of the present example, the UE 102 determines that a registration (ATTACH/TAU) attempt count is exceeded at 724.

At 616, the UE implements adaptive PLMN management m response to the determination regarding the network conditions and registration failures. As noted, the PLMN may be blocked from registration for a duration of time after multiple failed registration attempts. Here, the UE may search for cells available or preferred PLMNs or monitor network conditions with the PLMN while blocked. Continuing the ongoing example, the UE 102 implements adaptive PLMN management at 726 after the attempt count is exceeded and the PLMN is placed on the temporary forbidden PLMN list.

At 618, the UE unblocks the PLMN for reattempting registration in response to an improvement in the network conditions. As described, the UE may adaptively unblock the PLMN when signaling conditions of a UE improve, such as when the UE moves to an area with improved network coverage. As a result, the UE may register with a PLMN more quickly than permitted by conventional techniques. In some cases, the UE can register with the PLMN after moving out of a poor signaling area (e.g., poor network conditions) without waiting for an entire duration of time as specified by various communication specifications for PLMNs on the forbidden list (e.g., 12 minutes). Concluding the present example, the UE reattempts registration by returning to 722, which the UE may attempt to do until the attempt/failure count is exceeded again and the PLMN is re-blocked.

Figure 8:
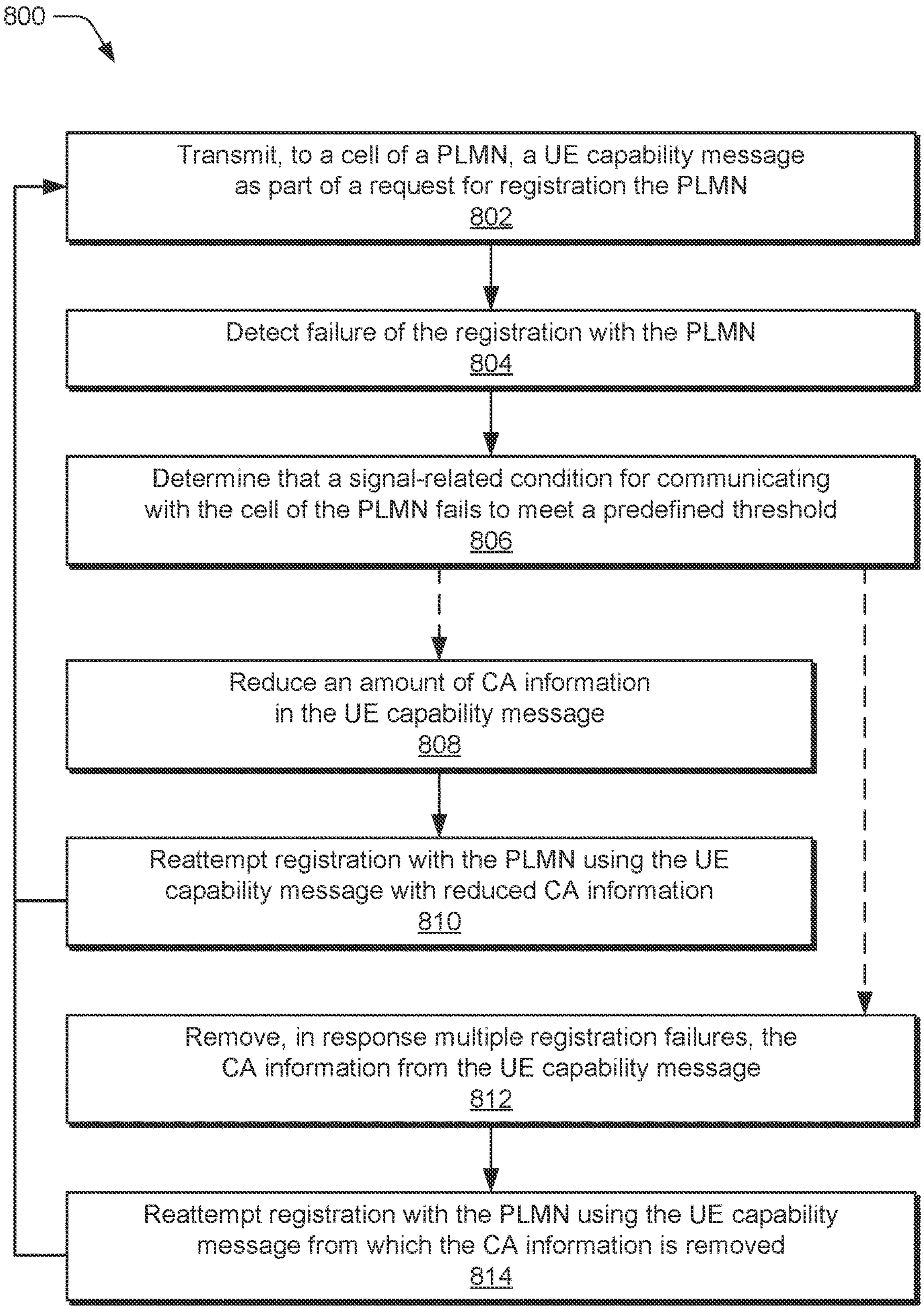
FIG. 8 illustrates an example method of adaptive UE capability management for marginal network conditions.

FIG. 8 illustrates an example method 800 of adaptive UE capability management for marginal network conditions. Generally, the method 800 reduces an amount of carrier aggregation (CA) information in a UE capability message for registration in poor network conditions. In some aspects, operations of the method 800 are implemented by or with a PLMN manager 144, UE capability manager 146, PLMN information 232, and/or UE capability information 234 of the user equipment 102.

At 802, a UE transmits, to a base station, a UE capability message as part of a request for registration with a PLMN. The request for registration may include an ATTACH request or TAU request for the PLMN. In some cases, the ATTACH request or TAU request includes a UE capability message of bands, radio access technologies (RATs), and/or carrier aggregation (CA) band combinations supported by the UE.

At 804, the UE detects failure of the registration with the PLMN. The failure of the registration may include failure of the ATTACH request or failure of the TAU request. The failure of the registration with the PLMN may include a release of the RRC connection, radio link failure, or failure due to a lower layer cause. In some cases, the UE may determine that an amount of time between transmission of a UE capability message and release of the RRC connection is greater than a predefined value (e.g., three seconds).

At 806, the UE determines that a signal-related condition for communicating with the base station of the PLMN fails to meet a predefined threshold. The UE may compare the signal-related characteristic to the predefined threshold (e.g., −110 dBm, −115 dBm, or −120 dBm) to determine a signaling state (e.g., poor signaling) or network conditions (e.g., poor or marginal conditions) associated with the cell of the PLMN. From the determination operation of 806, the method 800 can proceed to operation 808 and/or operation 810, such as when a maximum number of registration attempts have not yet been made. Alternatively, the method 800 may proceed from operation 806 to operation 812, such as when the UE determines that a next registration attempt is a last registration attempt before the maximum number of registration attempts will be met.

At 808, the UE reduces an amount of CA information in the UE capability message. The UE may reduce the amount of the CA information in response to the determination that the signal-related condition for a connection with the base station is poor (e.g., weak signal coverage). Generally, reducing the amount of CA information in the UE capability message includes removing a number of CA band combinations from the UE capability message. In some cases, the UE predicts (e.g., through machine learning) or estimates a number of CA band combinations that can be successfully transmitted to the network, such as based on CA band combinations sent in previously successful registration attempts. These CA band combinations may then be removed to reduce a size of the UE capability message.

At 810, the UE reattempts registration with the PLMN using the UE capability message with reduce CA information. This may include transmitting another ATTACH request or TAU request at operation 802 with the modified UE capability message that includes a reduced number or subset of CA information. If the reattempt at registration is successful, the UE may then access services available through the PLMN. Alternatively or additionally, the UE may reattempt registration multiple times up to a threshold for a number of maximum attempts or failures (e.g., five attempts or failures). With each iteration of adaptive UE capability management, the UE may remove additional CA information with each registration reattempt. As such, the method 800 may repeat operations 802 through 810 until a maximum number of registrations are attempted. During a last iteration, the method 800 may proceed from operation 806 to operation 812 in response to the UE determining that the next registration attempt is the last registration attempt before the maximum number of registration attempts will be met.

At 812, the UE removes, in response to multiple registration failures, the CA information from the UE capability message. For example, as a last attempt to register with the PLMN the UE may remove any remaining CA band combinations from the UE capability message to minimize a size of the message and further increase the likelihood of successful registration with the network. In such a case, the UE capability message may include minimal UE capabilities that include frequency bands and RATs supported by the UE.

At 814, the UE reattempts registration with the PLMN using the UE capability message from which the CA information is removed. This may include transmitting another ATTACH request or TAU request at operation 802 with the modified UE capability message that includes minimal or no CA information. If the registration is successful, the UE may then access services available through the PLMN. Alternatively, if registration is unsuccessful, the UE may block the PLMN and implement adaptive PLMN management to enable quick reattach when network conditions improve.

Figure 9:
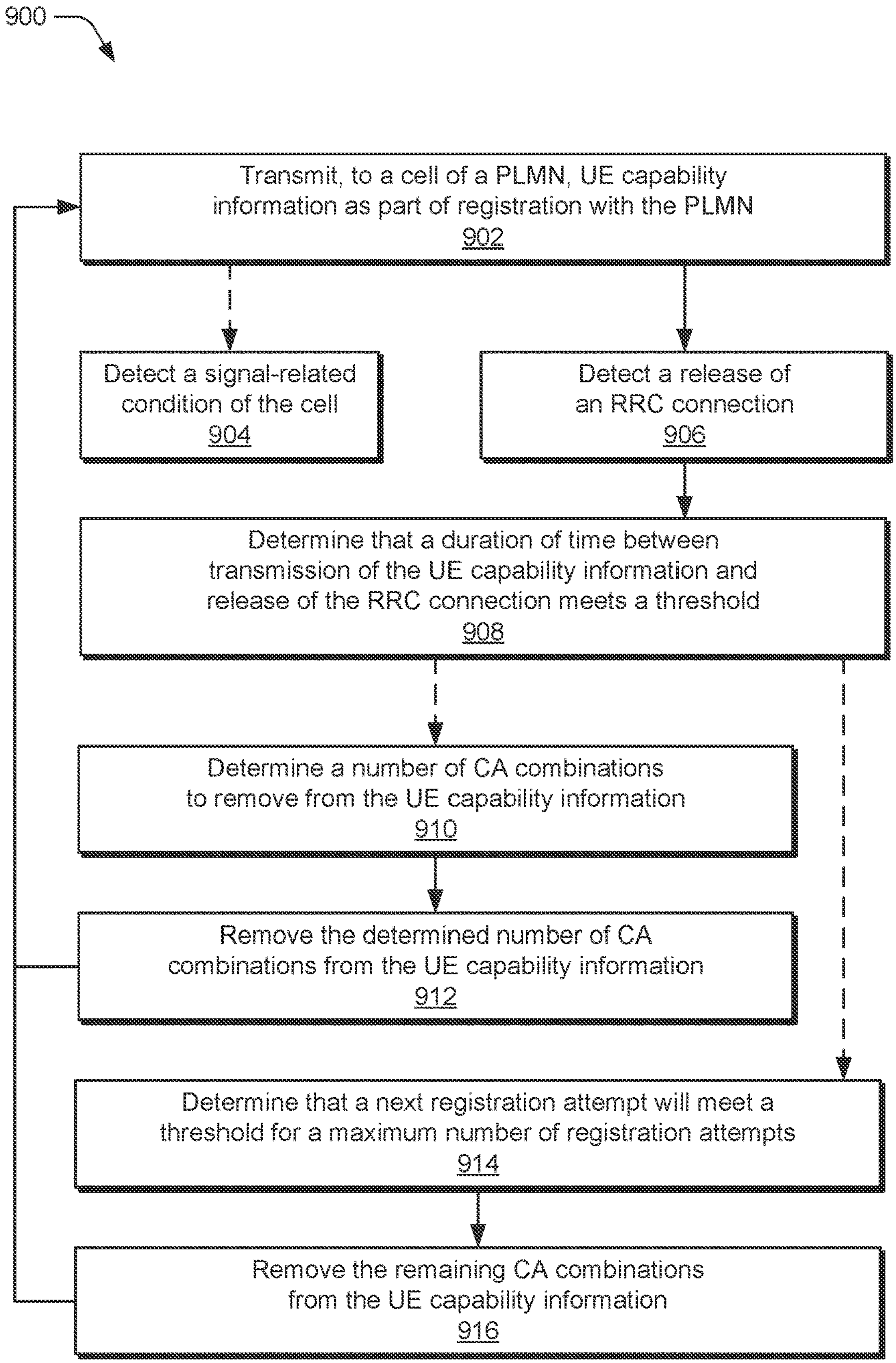
FIG. 9 illustrates an example method of altering earner aggregation (CA) information useful for PLMN registration in accordance with one or more aspects.

FIG. 9 illustrates an example method of altering carrier aggregation (CA) information useful for PLMN registration in accordance with one or more aspects. Generally, the method 900 detects registration (e.g., ATTACH request or TAU request) failure due to poor signal coverage during a UE capability inquiry stage and gradually reduces UE capability information in subsequent registration reattempts. In some aspects, operations of the method 900 are implemented by or with a PLMN manager 144, UE capability manager 146, PLMN information 232, and/or UE capability information 234 of the user equipment 102.

At 902, a UE transmits, to a cell of a PLMN, UE capability information as part of registration with PLMN. The UE capability information may be included with an ATTACH request or TAU request sent to the PLMN. Generally, the ATTACH request or TAU request may a UE capability message of bands, radio access technologies (RATs), and/or carrier aggregation (CA) band combinations supported by the UE.

Optionally at 904, the UE detects a signal-related condition of the cell. In some cases, the UE compares the signal-related characteristic (e.g., RSRP or RSRQ) to the predefined threshold (e.g., −110 dBm, −115 dBm, or −120 dBm) to determine a signaling state (e.g., poor signaling) or network conditions (e.g., poor or marginal conditions) associated with the cell of the PLMN.

At 906, the UE detects a release of a radio resource control (RRC) connection with the base station. The release of the RRC connection may be detected after transmission of the UE capability information to the cell of the PLMN. Alternatively or additionally, a lower layer failure may cause failure of the registration or loss of the RRC connection with the cell of the PLMN.

At 908, the UE determines that a duration of time between transmission of the UE capability information and release of the RRC connection meets a threshold. For example, the UE may determine that an amount of time between transmission of a UE capability message and release of the RRC connection is greater than three seconds (or another guard time). This may indicate that the UE was unable to successfully transmit the entire UE capability message to the network within a guard time.

From the RRC release operation of 908, the method 900 can proceed to operation 910 and/or operation 912, such as when a maximum number of registration attempts have not yet been made. Alternatively, the method 900 may proceed from operation 908 to operation 914, such as when the UE determines that a next registration attempt will meet a threshold for a maximum number of registration attempts.

At 910, the UE determines a number of CA combinations to remove from the UE capability message. In some cases, the UE determines or predicts (e.g., through machine learning) a number of CA band combinations that can be successfully transmitted to the network, such as based on a number or size (e.g., number of bytes) of CA band combinations sent in previously successful registration attempts. Alternatively, the EU may remove a predetermined portion, ratio, or fraction of the CA combinations from the UE capability message with each iteration of operation 910.

At 912, the UE removes the determined number of CA combinations from the UE capability information. The method 900 may then return to operation 902 at which the UE reattempts registration with the PLMN using the UE capability information with fewer CA combinations. If the reattempt at registration is successful, the UE may then access services available through the PLMN. Alternatively, the method 900 may perform additional iterations of operations 902 through 912 until a maximum number of registrations are attempted.

At 914, the UE determines that a next registration attempt will meet a threshold for a maximum number of registration attempts. In other words, the UE determines that a next reattempt for registration will be a last attempt before the PLMN is blocked for a duration of time.

At 916, the UE removes the remaining CA combinations from the UE capability message. For example, as a last attempt to register with the PLMN the UE may remove any remaining CA band combinations from the UE capability message to minimize a size of the message and further increase the likelihood of successful registration with the network. The UE then reattempts registration with the PLMN using the UE capability message from which the CA information is removed. If the last attempt at registration is successful, the UE may then access services available through the PLMN. Alternatively, if registration is unsuccessful, the UE may implement adaptive PLMN management once the PLMN is blocked.

Figure 10:
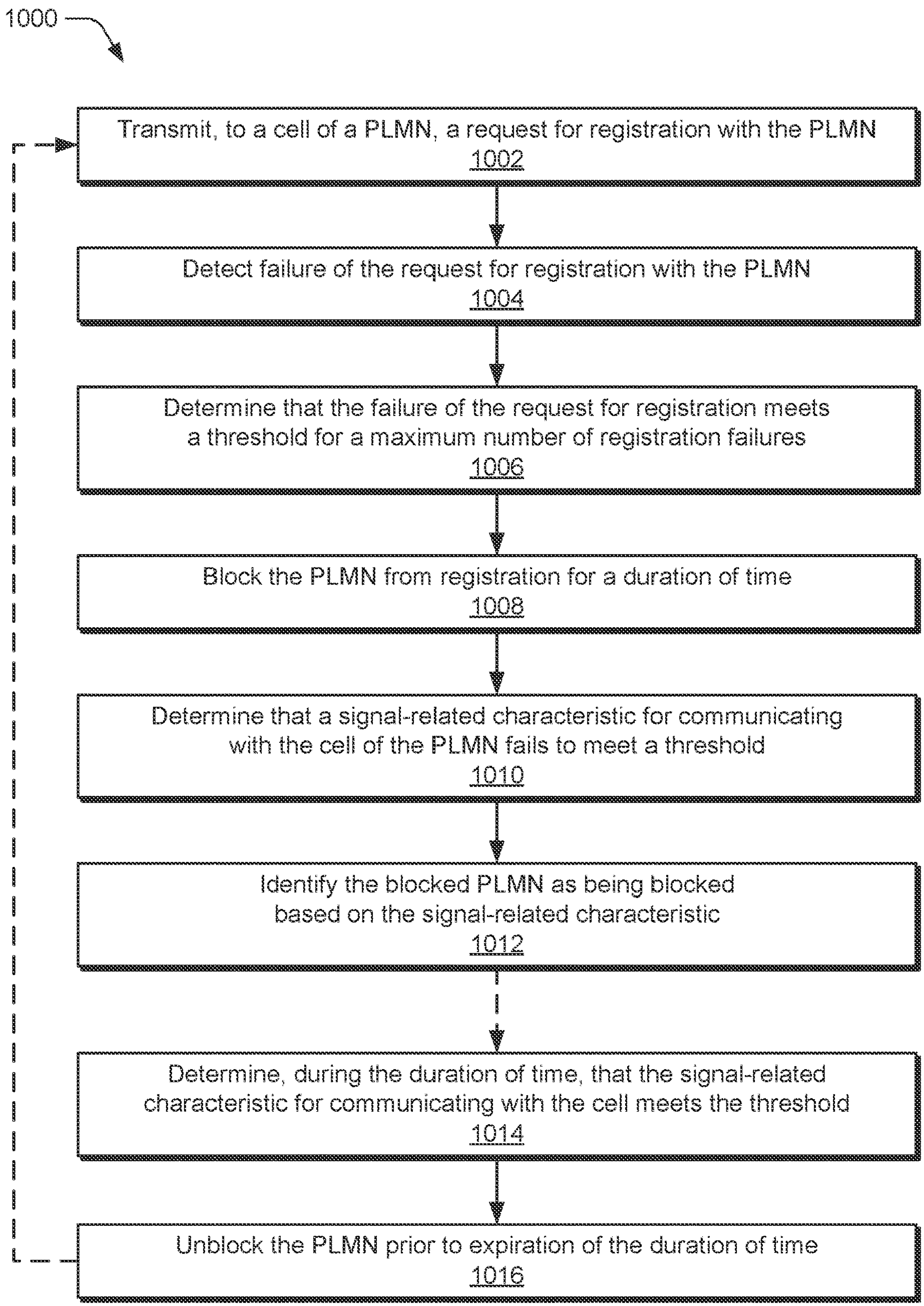
FIG. 10 illustrates an example method for adaptive PLMN management for varying network conditions.

FIG. 10 illustrates an example method 1000 of adaptive PLMN management for varying network conditions. Generally, the method 1000 unblocks a PLMN identified as being blocked for a signal-related condition when the signal-related condition improves. In some aspects, operations of the method 1000 are implemented by or with a PLMN manager 144, UE capability manager 146, PLMN information 232, and/or UE capability information 234 of the user equipment 102.

At 1002, a UE transmits, to a cell, a request for registration with a PLMN. The request for registration may include an ATTACH request or TAU request for the PLMN.

At 1004, the UE detects failure of the registration with the PLMN. The failure may include failure of an ATTACH request or failure of a TAU request. In some cases, the registration failure includes a release of the RRC connection, radio link failure, or failure due to a lower layer cause.

At 1006, the UE determines that the request for registration meets a threshold for a maximum number of registration attempts. In other words, the UE determines that a maximum number of registration attempts have been made before the PLMN is blocked for a duration of time.

At 1008, the UE blocks the PLMN for registration for a predefined duration of time. To block the PLMN, the UE may add the PLMN to a temporary forbidden PLMN list, which is configured to block the PLMN for predefined duration of time (e.g., 12 minutes per a T3402 timer).

At 1010, the UE determines that a signal-related characteristic for communicating with the cell of the PLMN fails to meet a predefined threshold. The UE may compare the signal-related characteristic to the predefined threshold (e.g., −110 dBm, −115 dBm, or −120 dBm) to determine a signaling state (e.g., poor signaling) or network conditions (e.g., poor or marginal conditions) associated with the cell of the PLMN.

At 1012, the UE identifies the blocked PLMN as being blocked based on the signal-related characteristic. In some cases, the blocked PLMN is flagged, labeled, or identified in a PLMN database as being blocked based on a signal-related condition, such as poor signaling. Alternatively or additionally, this may enable the UE to track or monitor the PLMN on the temporary forbidden PLMN list as a candidate PLMN for attachment when network conditions change or improve.

At 1014, the UE detects an improvement in the signal-related characteristic for the blocked PLMN. The UE may monitor or measure signal-related characteristics while the PLMN is blocked for the duration of time. Alternatively or additionally, the UE may periodically check network conditions to determine if the signal-related characteristic has improved. For example, a better system reselection (BSR) timer or other UE specific events may trigger a cell scan in which the UE may detect improvements or differences in respective signal-related characteristics of one or more cells.

At 1016, the UE unblocks the PLMN prior to expiration of the predefined duration of time. Generally, the UE unblocks the PLMN to enable another attempt at registration with the PLMN. In some cases, the UE unblocks the PLMN when the UE moves to an area with moderate or good network coverage. In some aspects, the detection of improved network conditions or unblocking may occur responsive to a UE specific event that occurs during the duration of time for which the PLMN would normally be blocked. As such, adaptive PLMN unblocking may enable a reattempt for registration sooner and/or with greater frequency. For example, in the case of a 120 second BSR timer, the UE may check signal conditions and/or reattempt registration (with 5 attempts) every two minutes, or six times within 12 minutes of the length of a typical temporary PLMN forbidden list timer.

Figure 11A:
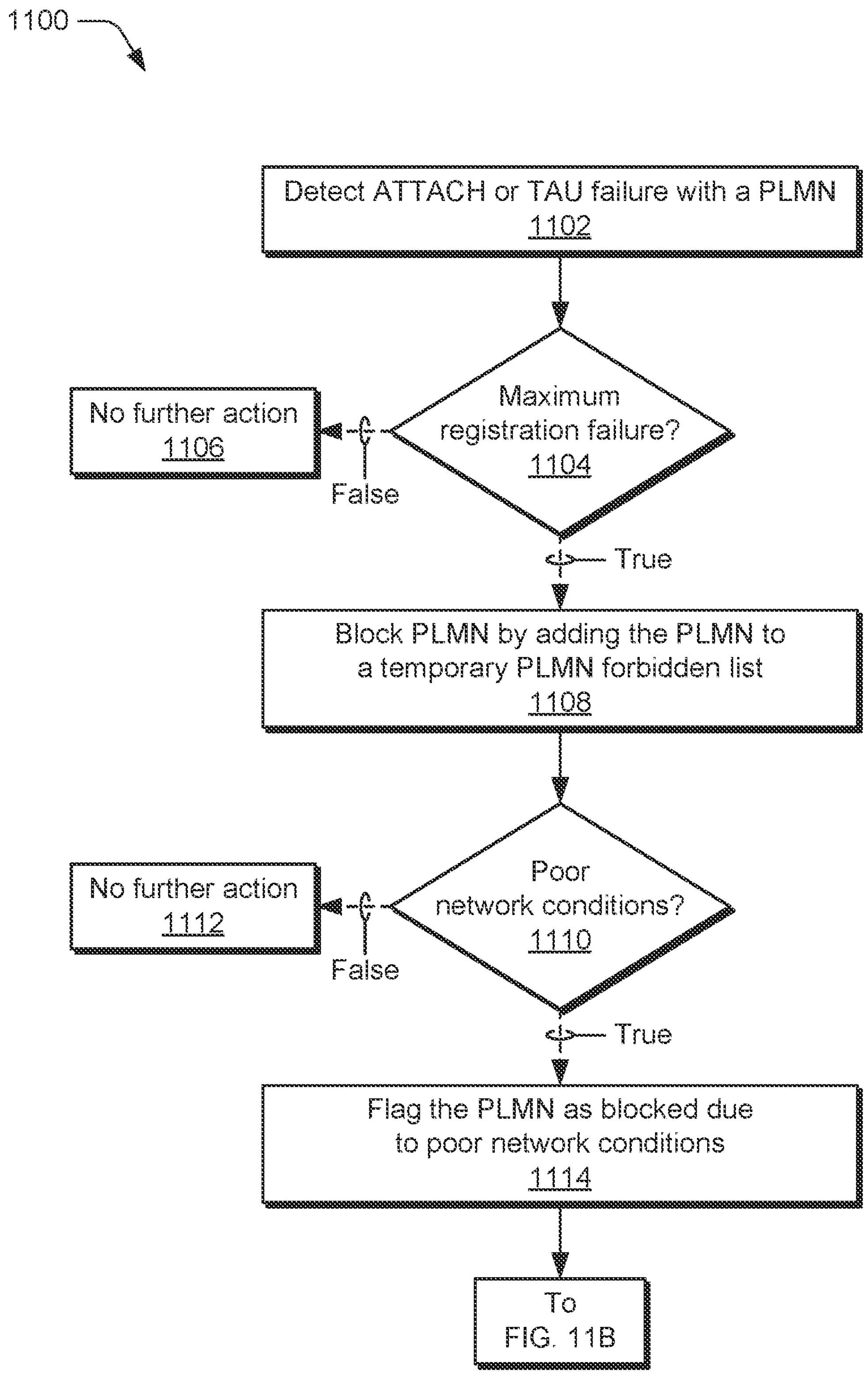

FIGS. 11A and 11B illustrate an example method 1100 of adaptive PLMN unblocking in varying network conditions. Generally, the method 1100 unblocks a blocked PLMN that is flagged for poor network conditions when the PLMN meets network conditions (e.g., signal strength improves). In some aspects, operations of the method 1100 are implemented by or with a PLMN manager 144, UE capability manager 146, PLMN information 232, and/or UE capability information 234 of the user equipment 102.

At 1102, the UE detects an ATTACH/TAU failure with a PLMN. The ATTACH may be an initial ATTACH or the TAU may be a periodic TAU. At 1104, the UE determines whether the ATTACH failure is a maximum or last registration failure that results in blocking of the PLMN. At 1106, if the ATTACH failure is not a maximum registration failure (False), the UE takes no further action with respect to blocking the PLMN with which the ATTACH failure is detected. The UE may reattempt registration with the PLMN by transmitting another ATTACH request or another tracking area update request.

At 1108, if the ATTACH failure is a maximum registration failure (True), the UE blocks the PLMN by adding the PLMN to a temporary PLMN forbidden list. The PLMN may remain on the temporary PLMN forbidden list until a T3402 timer expires, at which point the PLMN may be removed from the PLMN forbidden list automatically.

At 1110, the UE determines whether network conditions between the UE and the base station of the PLMN are poor (e.g., poor signal coverage). The UE may compare the signal-related characteristic to the predefined threshold (e.g., 110 dBm, −115 dBm, or −120 dBm) to determine a signaling state (e.g., poor signaling) or network conditions (e.g., poor or marginal conditions) associated with a cell of the PLMN. Alternatively or additionally, the UE may determine that signaling conditions are poor in response to a release of the RRC connection, radio link failure, or registration failure due to a lower layer cause. At 1112, if the network conditions are not poor (False), the UE takes no further action with respect to flagging or labeling the blocked PLMN on the temporary PLMN forbidden list. In some cases, the UE waits until the timer of the PLMN forbidden list expires before reattempting registration with the PLMN.

At 1114, the UE flags the PLMN on the temporary forbidden list as blocked due to poor network conditions. By so doing, the UE may track or monitor the PLMN while on the temporary PLMN forbidden list. From FIG. 11A, the method 1100 proceeds to FIG. 11B where the operations of the method 1100 continue as shown at 1116.

At 1118, the UE initiates a new registration procedure. The registration procedure may be initiated in response to user selection, a better system reselection (BSR) procedure, a UE specific procedure, or the like. At 1120, the UE performs a PLMN search through an acquisition database of locally stored PLMN information, such as for preferred or previously associated PLMNs. In some cases, the PLMN search is performed in response to initiation of the new registration procedure or better cell reselection procedure.

At 1122, the UE reviews the search results of the PLMN search for searched cells that may be associated with the PLMN blocked for poor network conditions. At 1124, if the search cells do not serve the blocked PLMN (False), the UE takes no further action with respect to those cells. At 1126, if the network conditions (e.g., signal strength) of the searched cells of the blocked PLMN meet a threshold for reattempting the ATTACH on the blocked PLMN, then the UE unblocks the PLMN for registration before removal from the temporary PLMN forbidden list before expiration of the time. In other words, the UE will temporarily unblock the PLMN from the forbidden PLMN list and will reinitiate an ATTACH or TAU registration procedure. At 1126, if the searched cells do not meet the threshold for reattempting registration, the method 1100 takes no further action with respect to the blocked PLMN. Alternatively, if no PLMNs are found during the search, the UE may perform a full band PLMN search.

At 1132, the UE successfully registers with the PLMN. The UE may then access network services or resources, and the T3402 timer of the temporary PLMN forbidden list will be stopped. Alternatively at 1134, the UE returns the PLMN to the temporary PLMN forbidden list if the registration is not successful. In some cases, the timer of the temporary PLMN forbidden is not reset and the UE may unblock the PLMN multiple times (e.g., returning to operation 1118) before the expiration of the list timer.

Example Devices and Systems

Figure 12:
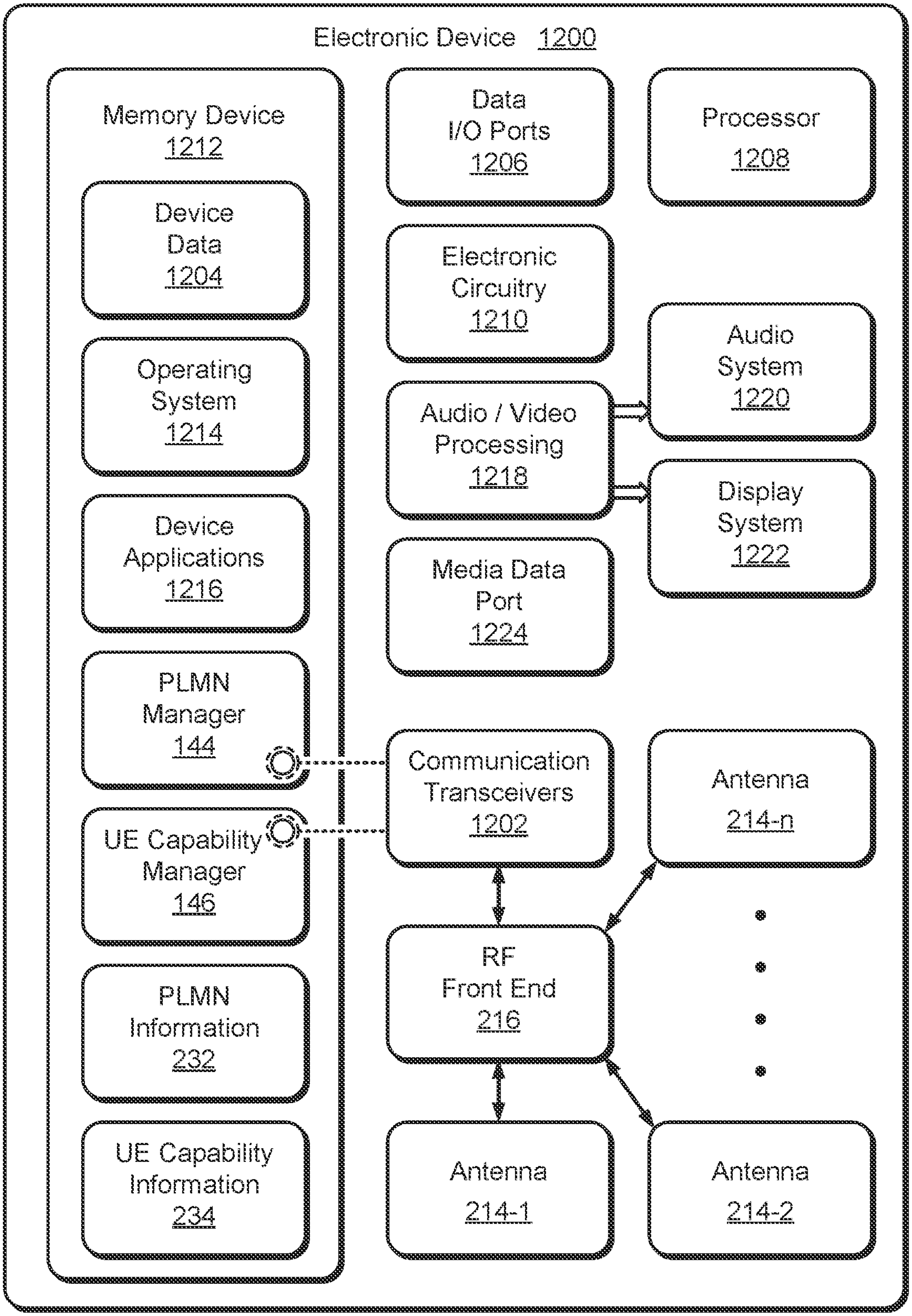
FIG. 12 illustrates an example electronic device that may implement techniques of adaptive PLMN management for varying network conditions.

FIG. 12 illustrates various components of an example electronic device 1200 that can implement adaptive PLMN management for varying network conditions in accordance with one or more aspects as described with reference to any of the preceding FIGS. 1-11. The electronic device 1200 may be implemented as any one or a combination of a fixed or mobile device, in any form of a consumer device, computing device, portable device, user device, user equipment, server, communication device, phone, navigation device, gaming device, media device, messaging device, media player, and/or other type of electronic device or a wirelessly-enabled device. For example, the electronic device 1200 may be implemented as a smart-phone, phone-tablet (phablet), laptop computer, set-top box, wireless drone, computing-glasses, vehicle-based computing system, or wireless broadband router.

The electronic device 1200 includes communication transceivers 1202 that enable wired and/or wireless communication of device data 1204, such as received data, transmitted data, or other information as described above. Example communication transceivers 1202 include NFC transceivers, WPAN radios compliant with various IEEE 802.15 standards, WLAN radios compliant with any of the various IEEE 802.11 standards, WWAN (e.g., 3GPP-compliant) radios for cellular telephony, wireless metropolitan area network (WMAN) radios compliant with various IEEE 802.16 standards, and wired local area network (LAN) Ethernet transceivers. In some aspects, multiple communication transceivers 1202 or components thereof are operably coupled with respective instances of antennas 214-1 through **214-*n* and an RF front end 216 embodied on the electronic device 1200. The antennas 214-1 through 214-*n* and RF front end 216 of the electronic device 1200 may be implemented similarly or differently from antennas 214 and/or an RF front end 216 as described with reference to FIGS. 1-11**.

The electronic device 1200 may also include one or more data input/output ports 1206 (data I/O ports 1206) via which any type of data, media content, and/or other inputs can be received, such as user-selectable inputs, messages, applications, music, television content, recorded video content, and any other type of audio, video, and/or image data received from any content and/or data source. The data I/O ports 1206 may include USB ports, coaxial cable ports, and other serial or parallel connectors (including internal connectors) for flash memory, DVDs, CDs, and the like. These data I/O ports 1206 may be used to couple the electronic device to components, peripherals, or accessories such as keyboards, microphones, or cameras.

The electronic device 1200 of this example includes at least one processor 1208 (e.g., one or more application processors, processor cores microprocessors, digital-signal processors (DSPs), controllers, or the like), which can include a combined processor and memory system, that executes computer-executable instructions stored on computer-readable media to control operation or implement functionalities of the device. Generally, a processor or processing system may be implemented at least partially in hardware, which can include components of an integrated circuit or a system-on-a-chip, a digital-signal processor (DSP), an application-specific integrated circuit (ASIC), a field programmable gate array (FPGA), a complex programmable logic device (CPLD), and other implementations in silicon and/or other hardware.

Alternatively or additionally, the electronic device 1200 can be implemented with any one or a combination of electronic circuitry 1210, which may include hardware, fixed logic circuitry, or physical interconnects (e.g., traces or connectors) that are implemented in connection with processing and control circuits. This electronic circuitry 1210 can implement executable or hardware-based modules (not shown) through logic circuitry and/or hardware, such as an FPGA or CPLD. Although not shown, the electronic device 1200 may also include a system bus, interconnect fabric, crossbar, or data transfer system that couples the various components within the device. A system bus or interconnect fabric can include any one or combination of different bus structures or IP blocks, such as a memory bus, memory controller, a peripheral bus, a universal serial bus, interconnect nodes, and/or a processor or local bus that utilizes any of a variety of bus architectures.

The electronic device 1200 also includes one or more memory devices 1212 that enable data storage, examples of which include RAM, SRAM, DRAM, NV-RAM, ROM, erasable programmable ROM (EPROM), Flash memory, and a disk storage device. Any or all of the memory devices 1212 may enable persistent and/or non-transitory storage of information, data, or code, and thus do not include transitory signals or carrier waves in the general context of this disclosure. For example, the memory device(s) 1212 provide data storage mechanisms to store the device data 1204 and other types of data (e.g., user data). The memory device 1212 may also store an operating system 1214, firmware, and/or device applications 1216 of the electronic device as instructions, code, or information. These instructions or code can be executed by the processor 1208 to implement various functionalities of the electronic device, such as to provide a user interface, enable data access, or manage connectivity with a wireless network. In this example, the memory device 1212 also stores processor-executable code or instructions for providing respective instances of a PLMN manager 144 and UE capability manager 146, which may be implemented similarly to or differently from the PLMN manager or UE capability manager described with reference to FIGS. 1-11. The memory device also includes PLMN information 232 (e.g., acquisition database) and UE capability information, which may be accessed by the PLMN manager or UE capability manager to implement aspects described throughout the disclosure.

As shown in FIG. 12, the electronic device 1200 may include an audio and/or video processing system 1218 for processing audio data and/or passing through the audio and video data to an audio system 1220 and/or to a display system 1222 (e.g., a video buffer or device screen). The audio system 1220 and/or the display system 1222 may include any devices that process, display, and/or otherwise render audio, video, graphical, and/or image data. Display data and audio signals can be communicated to an audio component and/or to a display component via an RF link, S-video link, HDMI (high-definition multimedia interface), Display Port, composite video link, component video link, DVI (digital video interface), analog audio connection, or other similar communication link, such as media data port 1224. In some implementations, the audio system 1220 and/or the display system 1222 are external or separate components of the electronic device 1200. Alternatively, the display system 1222 can be an integrated component of the example electronic device 1200, such as part of an integrated display with touch interface.

Alternatively or additionally, the electronic device 1200 may represent an example implementation of the UEs 102 as described throughout the present disclosure. Thus, in some cases the processor 1208 is an example of the processor 222 (not shown) and/or the memory device 1212 is an example of the computer-readable storage media 224 (not shown) for storing various data, instructions, or code for implementing a diversity controller or other applications. As such, aspects of adaptive PLMN management for varying network conditions as described herein can be implemented by, or in conjunction with, the electronic device 1200 of FIG. 12.

Figure 13:
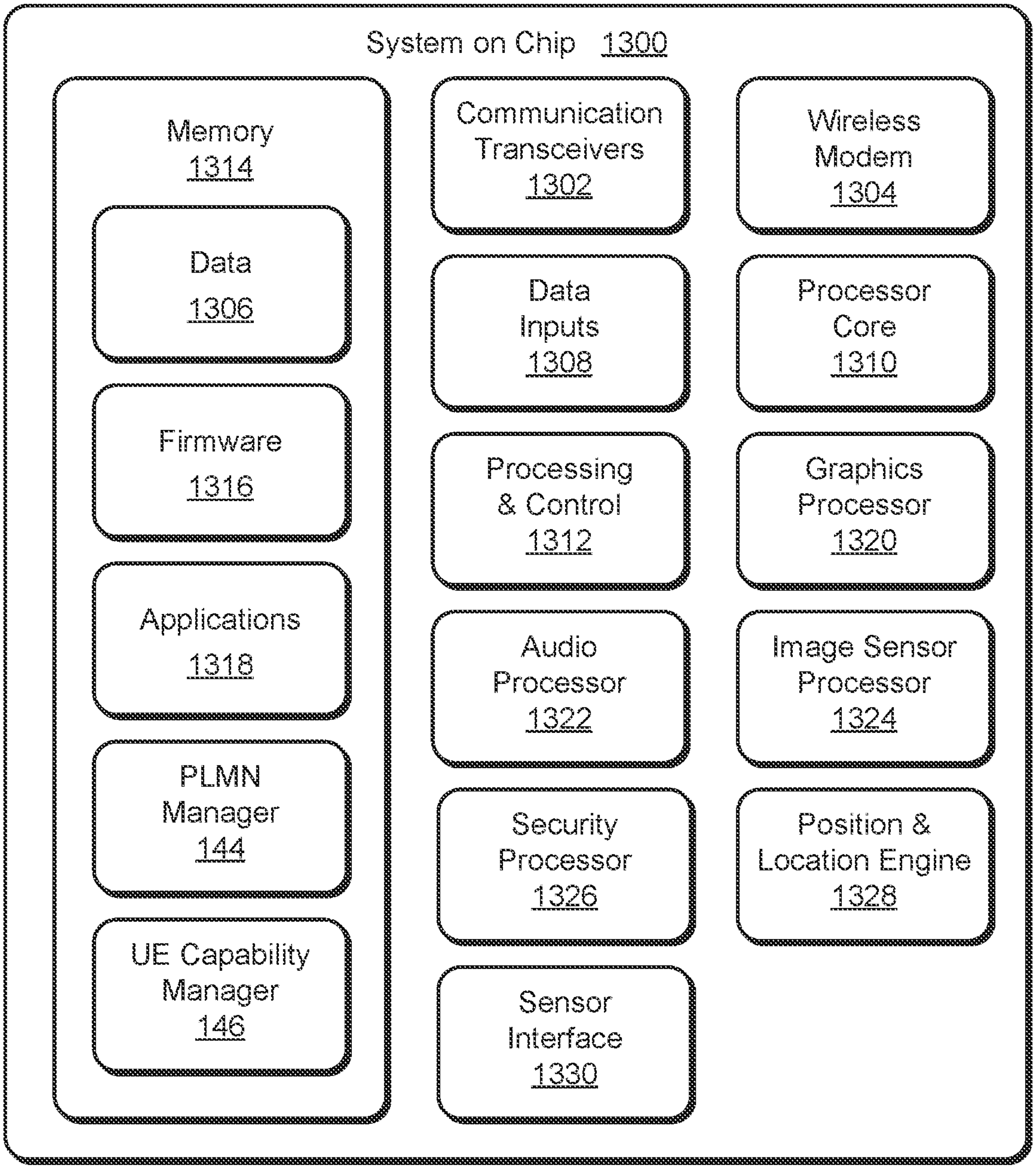
FIG. 13 illustrates an example system on chip (SoC) environment in which techniques of adaptive PLMN management for varying network conditions may be implemented.

FIG. 13 illustrates an example system on chip (SoC) that may implement aspects of adaptive PLMN management for varying network conditions. The SoC 1300 may be embodied as or within any type of UE 102, user equipment, user device, apparatus, other device, or system as described with reference to FIGS. 1-12 to implement adaptive PLMN management for varying network conditions. Although described with reference to chip-based packaging, the components shown in FIG. 13 may also be embodied as other systems or component configurations, such as, and without limitation, a Field-Programmable Gate Array (FPGA), an Application-Specific Integrated Circuit (ASIC), an Application-Specific Standard Product (ASSP), a digital signal processor (DSP), Complex Programmable Logic Devices (CPLD), system in package (SiP), package on package (PoP), processing and communication chip set, communication co-processor, sensor co-processor, or the like.

In this example, the SoC 1300 includes communication transceivers 1302 and a wireless modem 1304 that enable wired or wireless communication of data 1306 (e.g., received data, data that is being received, data scheduled for broadcast, packetized, or the like). In some aspects, the wireless modem 1304 is a multi-mode multi-band modem or baseband processor that is configurable to communicate in accordance with various communication protocols and/or in different frequency bands, such as those protocols or frequency bands described throughout this disclosure. The wireless modem 1304 may include a transceiver interface (not shown) for communicating encoded or modulated signals with transceiver circuitry.

The data 1306 or other system content can include configuration settings of the system on chip 1300 or various components (e.g., PLMN information or UE capability information), media content stored by the system, and/or information associated with a user of the system. Media content stored on the system on chip 1300 may include any type of audio, video, and/or image data. The system on chip 1300 also includes one or more data inputs 1308 via which any type of data, media content, and/or inputs can be received, such as user input, user-selectable inputs (explicit or implicit), or any other type of audio, video, and/or image data received from a content and/or data source. Alternatively or additionally, the data inputs 1308 may include various data interfaces, which can be implemented as any one or more of a serial and/or parallel interface, a wireless interface, a network interface, and as any other type of communication interface enabling communication with other devices or systems.

The system on chip 1300 includes one or more processor cores 1310, which process various computer-executable instructions to control the operation of the system on chip 1300 and to enable techniques for adaptive PLMN management for varying network conditions. Alternatively or additionally, the system on chip 1300 can be implemented with any one or combination of hardware, firmware, or fixed logic circuitry that is implemented in connection with processing and control circuits, which are generally shown at 1312. Although not shown, the system on chip 1300 may also include a bus, interconnect, crossbar, or fabric that couples the various components within the system on chip 1300.

The system on chip 1300 also includes a memory 1314 (e.g., computer-readable media), such as one or more memory circuits that enable persistent and/or non-transitory data storage, and thus do not include transitory signals or carrier waves. Examples of the memory 1314 include RAM, SRAM, DRAM, NV-RAM, ROM, EPROM or Flash memory. The memory 1314 provides data storage for the system data 1306, as well as for firmware 1316, applications 1318, and any other types of information and/or data related to operational aspects of the system on chip 1300. For example, the firmware 1316 can be maintained as processor-executable instructions of an operating system (e.g., real-time OS) within the memory 1314 and executed on one or more of the processor cores 1310.

The applications 1318 may include a system manager, such as any form of a control application, software application, signal-processing and control module, code that is native to a particular system, an abstraction module or gesture module and so on. The memory 1314 may also store system components or utilities for implementing aspects of adaptive PLMN management for varying network conditions, such as a PLMN manager 144, UE capability manager 146, PLMN information 232 (not shown), and UE capability information 234 (not shown). These entities may be embodied as combined or separate components, examples of which are described with reference to corresponding entities or functionality as illustrated in FIGS. 1-11 or FIG. 13 or 14. Although shown in memory 1314, one or more elements of the PLMN manager 144 or UE capability manager 146 may be implemented, in whole or in part, through hardware or firmware.

In some aspects, the system on chip 1300 also includes additional processors or co-processors to enable other functionalities, such as a graphics processor 1320, audio processor 1322, and image sensor processor 1324. The graphics processor 1320 may render graphical content associated with a user interface, operating system, or applications of the system on chip 1300. In some cases, the audio processor 1322 encodes or decodes audio data and signals, such as audio signals and information associated with voice calls or encoded audio data for playback. The image sensor processor 1324 may be coupled to an image sensor and provide image data processing, video capture, and other visual media conditioning and processing functions.

The system on chip 1300 may also include a security processor 1326 to support various security, encryption, and cryptographic operations, such as to provide secure communication protocols and encrypted data storage. Although not shown, the security processor 1326 may include one or more cryptographic engines, cipher libraries, hashing modules, or random number generators to support encryption and cryptographic processing of information or communications of the system on chip 1300. Alternatively or additionally, the system on chip 1300 can include a position and location engine 1328 and a sensor interface 1330. Generally, the position and location engine 1328 may provide positioning or location data by processing signals of a Global Navigation Satellite System (GNSS) and/or other motion or inertia sensor data (e.g., dead-reckoning navigation). The sensor interface 1330 enables the system on chip 1300 to receive data from various sensors, such as capacitance and motion sensors.

Figure 14:
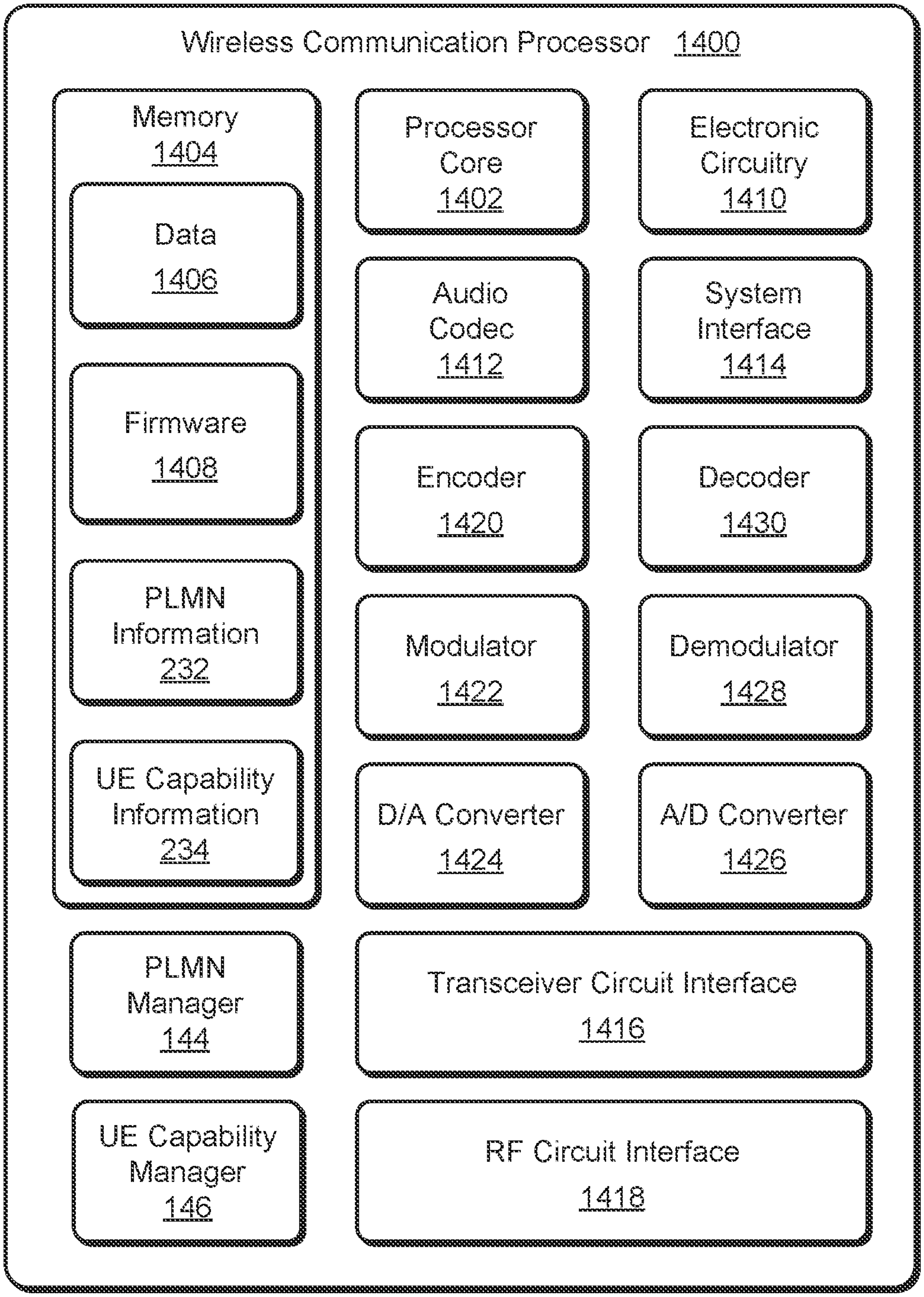
FIG. 14 illustrates an example configuration of a wireless communication processor that may implement various aspects of adaptive PLMN management for varying network conditions.

FIG. 14 illustrates an example configuration of a wireless communication processor 1400 (communication processor 1400) that may implement various aspects of PLMN management for varying network conditions. Although referred to generally as a communication processor, the communication processor 1400 may be implemented as a modem baseband processor, software-defined radio module, configurable modem (e.g., multi-mode, multi-band modem), wireless data interface, or wireless modem, such as wireless modem 1304 of the system on chip 1300. The wireless communication processor 1400 may be implemented in a device or system to support data access, messaging, or data-based services of a wireless network, as well as various audio-based communication (e.g., voice calls).

In this example, the wireless communication processor 1400 includes at least one processor core 1402 and a memory 1404, which is implemented as hardware-based memory that enables persistent and/or non-transitory data storage, and thus does not include transitory signals or carrier waves. The processor core 1402 may be configured as any suitable type of processor core, microcontroller, digital signal processor core, or the like. The memory 1404 may include any suitable type of memory device or circuit, such as RAM, DRAM, SRAM, non-volatile memory, flash memory, or the like. Generally, the memory stores data 1406 of the communication processor 1400, as well as firmware 1408 and other applications. The processor core 1402 may execute processor-executable instructions of the firmware 1408 or applications to implement functions of the communication processor 1400, such as signal processing and data encoding operations. The memory 1404 may also store data and information useful to implement aspects of adaptive PLMN management for varying network conditions. In some aspects, the memory 1404 of the communication processor 1400 includes PLMN information 232, UE capability information 234, or other information useful to implement adaptive PLMN management for varying network conditions (e.g., signaling data). Any of these entities may be implemented in combination or separately as shown in FIG. 14.

The communication processor 1400 may also include electronic circuitry 1410 for managing or coordinating operations of various components and an audio codec 1412 for processing audio signals and data. The electronic circuitry 1410 may include hardware, fixed logic circuitry, or physical interconnects (e.g., traces or connectors) that are implemented in connection with processing and control circuits of the communication processor and various components. The audio codec 1412 may include a combination of logic, circuitry, or firmware (e.g., algorithms) to support encoding and/or decoding of audio information and audio signals, such as analog signals and digital data associated with voice or sound functions of the communication processor 1400.

A system interface 1414 of the communication processor 1400 enables communication with a host system or application processor. For example, the communication processor 1400 may provide or expose data access functionalities to the system or application processor through the system interface 1414. In this example, the communication processor also includes a transceiver circuit interface 1416 and an RF circuit interface 1418, through which the communication processor 1400 may manage or control respective functionalities of a transceiver circuit or RF front end to implement various communication protocols and techniques. In various aspects, the communication processor includes digital signal processing or signal processing blocks for encoding and modulating data for transmission or demodulating and decoding received data.

In this example, the communication processor 1400 includes an encoder 1420, modulator 1422, and digital-to-analog converter 1424 (DIA converter 1424) for encoding, modulating, and converting data sent to the transceiver circuit interface. The communication processor also includes an analog-to-digital converter 1426 (AID converter 1426), demodulator 1428, and decoder 1430 for converting, demodulating, and decoding data received from the transceiver circuit interface 1416. In some aspects, these signal processing blocks and components are implemented as respective transmit and receive chains of the communication processor 1400, which may be configurable for different radio access technologies or frequency bands.

The wireless communication processor 1400 may also include a PLMN manager 144 and a UE capability manager 146. These entities may be embodied as combined or separate components, examples of which are described with reference to corresponding entities or functionality as illustrated in FIGS. 1-13. In some aspects, the PLMN manager 144 may unblock a PLMN from a temporary forbidden list, such as to enable registration with a PLMN in response to improved signaling conditions. Alternatively or additionally, the UE capability manager 146 may reduce or remove carrier aggregation information from a UE capability message to increase a probability of successful registration with a PLMN. The PLMN manager 144 and/or UE capability manager 146 of the wireless communication processor may be implemented, in whole or in part, through hardware or firmware.

Further to the descriptions above, a user may be provided with controls allowing the user to make an election as to both if and when devices, systems, applications, and/or features described herein may enable collection of user information, such as one or more of wireless link metrics, connection duration information, average connection length, signal quality/strength information, network identity information, network basic service set identifier (BSSID) information, recently utilized wireless communication bands/ channels, a user's preferences, a user's current location, if the user has communicated content or information with a server, or the like.

In addition, certain data may be treated in one or more ways before it is stored or used, so that personally identifiable information is removed. For example, a user's identity may be treated so that no personally identifiable information can be determined for the user. For example, a user's geographic location may be generalized or randomized about where location information is obtained (such as to a city, postal code, or state/province level), so that a particular location of a user cannot be determined. Thus, the user may have control(s) over what information is collected about the user, one or more devices of the user, how that information is used, and/or what information is provided to the user.

Although aspects of adaptive PLMN management for varying network conditions have been described in language specific to features and/or methods, the subject of the appended claims is not necessarily limited to the specific features or methods described. Rather, the specific features and methods are disclosed as example implementations of adaptive PLMN management for varying network conditions and other equivalent features and methods are intended to be within the scope of the appended claims. Further, various different aspects are described, and it is to be appreciated that each described aspect can be implemented independently or in connection with other described aspects.

What is claimed is:

1. A method performed by a user equipment (UE), the method comprising:
- determining that a data repository of public land mobile network (PLMN) information includes a PLMN blocked from registration for a predefined duration of time due to a signal-related condition of a connection between the UE and a cell of the PLMN;
- determining, during the predefined duration of time, that the signal-related condition of the connection between the UE and the cell of the PLMN has improved;
- responsive to the signal-related condition having improved during the predefined duration of time, unblocking the PLMN from registration; and
- transmitting, to the cell of the PLMN, a request for registration with the PLMN that is unblocked to enable registration with the PLMN before expiration of the predefined duration of time.

2. The method of claim 1, wherein the request for registration transmitted by the UE includes an ATTACH request or a tracking area update request.

3. The method of claim 1, wherein:
- the PLMN blocked from registration is on a temporary forbidden PLMN list;
- the unblocking of the PLMN removes the PLMN from the temporary forbidden PLMN list; and
- the predefined duration of time is tracked by a timer associated with the temporary forbidden PLMN list.

4. The method of claim 1, further comprising:
- measuring a signal-related characteristic of the connection between the UE and the cell of the PLMN; and
- responsive to a determination that the signal-related characteristic of the connection meets a threshold, determining that the signal-related condition has improved.

5. The method of claim 4, wherein the signal-related characteristic of the connection between the UE and the cell of the PLMN includes one or more of a received signal strength, a received signal quality, a reference signal receive power, a reference signal receive quality, a received signal strength indicator, a carrier-to-interference ratio, a signal-to-noise ratio, a bit-error rate, or a packet-error rate.

6. The method of claim 1, further comprising:
- detecting failure of the request for registration or a subsequent request for registration as part of a registration procedure; and
- re-blocking the PLMN for a remaining portion of the predefined duration of time.

7. The method of claim 6, wherein detecting the failure of the request for registration comprises:
- detecting a release of a radio resource control (RRC) connection by the cell of the PLMN or a radio link failure of a connection between the UE and the cell of the PLMN.

8. The method of claim 7, wherein detecting the failure of the request for registration further comprises:
- monitoring an amount of time that lapses between the transmitting a UE capability message and the release of the RRC connection by the cell of the PLMN;
- comparing the amount of time that lapses with a time-based threshold; and
- detecting the failure of the request for registration based on the amount of time exceeding the time-based threshold.

9. The method of claim 1, wherein the request for registration is a second request for registration, and the method further comprises:
- detecting a failure of a first request for registration with the PLMN;
- responsive to the failure of the first request being a maximum number of registration failures, blocking the PLMN from registration for the predefined duration of time; and
- responsive to the failure of the first request being due to the signal-related condition of the connection between the UE and the cell of the PLMN, identifying, in the data repository of PLMN information, the PLMN as being blocked due to the signal-related condition.

10. The method of claim 9, further comprising:
- measuring a signal-related characteristic of the connection between the UE and the cell of the PLMN; and
- responsive to the signal-related characteristic of the connection failing to meet a threshold, determining that the failure of the first request is due to the signal-related condition.

11. A user equipment comprising:
- a transceiver operably coupled with one or more antennas;
- a hardware-based processor associated with the transceiver; and
- computer-readable storage media storing instructions to direct the user equipment (UE) to:
  - determine that a data repository of public land mobile network (PLMN) information includes a PLMN blocked from registration for a predefined duration of time due to a signal-related condition of a connection between the UE and a cell of the PLMN;
  - determine, during the predefined duration of time, that the signal-related condition of the connection between the UE and the cell of the PLMN has improved;
  - responsive to the signal-related condition having improved during the predefined duration of time, unblock the PLMN from registration; and
  - transmit, to the cell of the PLMN, a request for registration with the PLMN that is unblocked to enable registration with the PLMN before expiration of the predefined duration of time.

12. The user equipment of claim 11, wherein the request for registration transmitted by the UE includes an ATTACH request for the PLMN or a tracking area update request for the PLMN.

13. The user equipment of claim 11, wherein:

the PLMN blocked from registration is on a temporary forbidden PLMN list;

the unblocking of the PLMN removes the PLMN from the temporary forbidden PLMN list; and the predefined duration of time is tracked by a timer associated with the temporary forbidden PLMN list.

14. The user equipment of claim 11, wherein to determine that the signal-related condition has improved, the instructions further direct the UE to:

measure a signal-related characteristic of the connection between the UE and the cell of the PLMN; and responsive to a determination that the signal-related characteristic of the connection meets a threshold, determine that the signal-related condition has improved.

15. The user equipment of claim 14, wherein the signal-related characteristic of the connection between the UE and the cell of the PLMN includes one or more of a received signal strength, a received signal quality, a reference signal receive power, a reference signal receive quality, a received signal strength indicator, a carrier-to-interference ratio, a signal-to-noise ratio, a bit-error rate, or a packet-error rate.

16. The user equipment of claim 11, wherein the instructions further direct the UE to:

detect failure of the request for registration or a subsequent request for registration as part of a registration procedure; and re-block the PLMN for a remaining portion of the predefined duration of time.

17. The user equipment of claim 16, wherein to detect the failure of the request for registration, the instructions further direct the UE to:

detect a release of a radio resource control (RRC) connection by the cell of the PLMN or a radio link failure of a connection between the UE and the cell of the PLMN.

18. The user equipment of claim 17, wherein to detect the failure of the request for registration, the instructions further direct the UE to:

monitor an amount of time that lapses between transmitting a UE capability message and the release of the RRC connection by the cell of the PLMN;

compare the amount of time that lapses with a time-based threshold; and detect the failure of the request for registration based on the amount of time exceeding the time-based threshold.

19. The user equipment of claim 11, wherein the request for registration is a second request for registration and the instructions further direct the UE to:

detect a failure of a first request for registration with the PLMN;

responsive to the failure of the first request being a maximum number of registration failures, block the PLMN from registration for the predefined duration of time; and responsive to the failure of the first request being due to the signal-related condition of the connection between the UE and the cell of the PLMN, identify, in the data repository of PLMN information, the PLMN as being blocked due to the signal-related condition.

20. The user equipment of claim 19, wherein the instructions further direct the UE to:

measure a signal-related characteristic of the connection between the UE and the cell of the PLMN; and responsive to the signal-related characteristic of the connection failing to meet a threshold, determine that the failure of the first request is due to the signal-related condition.

* * * * *